United States Patent
Groves et al.

(10) Patent No.: US 10,094,272 B2
(45) Date of Patent: Oct. 9, 2018

(54) LINKAGE FOR EXHAUST BYPASS VALVE OF MULTI-STAGE TURBOCHARGER

(71) Applicant: Honeywell International Inc., Morris Plains, NJ (US)

(72) Inventors: Chris Groves, Domevre sur Durbion (FR); Damien Marsal, Golbey (FR); Stephane Sibille, Thaon-les-vosges (FR); Andreas Heckner, Remiremont (FR)

(73) Assignee: Honeywell International Inc., Morris Plains, NJ (US)

( * ) Notice: Subject to any disclaimer, the term of this patent is extended or adjusted under 35 U.S.C. 154(b) by 148 days.

(21) Appl. No.: 15/192,615

(22) Filed: Jun. 24, 2016

(65) Prior Publication Data

US 2017/0016390 A1 Jan. 19, 2017

Related U.S. Application Data

(60) Provisional application No. 62/194,076, filed on Jul. 17, 2015.

(51) Int. Cl.

| F02D 23/00 | (2006.01) |
|---|---|
| F02B 33/44 | (2006.01) |
| F02B 33/00 | (2006.01) |
| F16K 31/00 | (2006.01) |
| F16K 31/12 | (2006.01) |
| F16K 15/00 | (2006.01) |

(Continued)

(52) U.S. Cl.
CPC .......... *F02B 37/186* (2013.01); *F16K 1/2007* (2013.01); *F16K 31/521* (2013.01); *F16H 21/44* (2013.01); *Y02T 10/144* (2013.01)

(58) Field of Classification Search
CPC .... F02B 37/186; F02B 37/0133; F02B 37/18; F16K 1/2007; F16K 31/521; F16K 31/025; F16K 31/1223; F16K 31/105; F16H 21/44; Y02T 10/144
USPC .......... 60/602, 612; 123/562; 137/553, 554, 137/556; 251/63.6, 11, 58, 334
See application file for complete search history.

(56) References Cited

U.S. PATENT DOCUMENTS

| 731,452 A | 6/1903 | Hamfeldt |
| 2,559,623 A * | 7/1951 | Holmes ................. F02B 37/186 |
| | | 60/600 |

(Continued)

FOREIGN PATENT DOCUMENTS

| DE | 738 316 C | 8/1943 |
| DE | 44 38 250 A1 | 5/1996 |

(Continued)

OTHER PUBLICATIONS

A Machine Translation of the reference to Kremina (Pub. No. DE 10 2010 020 115 A1), published on Nov. 10, 2011.*

(Continued)

*Primary Examiner* — Thai Ba Trieu
(74) *Attorney, Agent, or Firm* — Brian J. Pangrle

(57) ABSTRACT

An assembly for an exhaust bypass valve of a two-stage turbocharger can include a first turbocharger stage; a second turbocharger stage; an exhaust bypass valve that includes an open state and a closed state; and a linkage mechanism that links the exhaust bypass valve to an actuator where the linkage mechanism includes a locked state for the closed state of the exhaust bypass valve.

13 Claims, 27 Drawing Sheets

(51) Int. Cl.
*F02B 37/18* (2006.01)
*F16K 31/52* (2006.01)
*F16K 1/20* (2006.01)
*F16H 21/44* (2006.01)

(56) References Cited

U.S. PATENT DOCUMENTS

| | | | |
|---|---|---|---|
| 2,629,541 A * | 2/1953 | Couture | F02B 37/18 |
| | | | 60/602 |
| 3,254,660 A * | 6/1966 | Ray | F16K 31/105 |
| | | | 137/553 |
| 3,721,424 A | 3/1973 | Vanderlinden | |
| 4,280,679 A | 7/1981 | Shaw | |
| 4,445,424 A * | 5/1984 | Foster | F16K 31/1223 |
| | | | 137/556 |
| 4,523,516 A * | 6/1985 | Foster | F16K 31/1223 |
| | | | 251/63.6 |
| 4,836,496 A * | 6/1989 | Abujudom | F16K 31/025 |
| | | | 251/11 |
| 4,893,474 A * | 1/1990 | Miller | F02B 37/183 |
| | | | 60/602 |
| 4,915,354 A * | 4/1990 | Sims, Jr. | F16K 1/42 |
| | | | 251/334 |
| 6,199,822 B1 * | 3/2001 | Hakansson | F02B 37/186 |
| | | | 251/58 |
| 7,708,254 B2 | 5/2010 | Herzog | |
| 8,353,153 B2 | 1/2013 | Kotrba et al. | |
| 8,485,498 B2 * | 7/2013 | Takeda | F02B 37/186 |
| | | | 137/554 |
| 2012/0304952 A1 | 12/2012 | Perrin | |
| 2013/0098181 A1 | 4/2013 | Thiery | |
| 2014/0127004 A1 * | 5/2014 | Schaeflein | F02B 37/186 |
| | | | 415/159 |
| 2014/0322046 A1 * | 10/2014 | Yamaguchi | F02B 37/186 |
| | | | 417/405 |
| 2015/0247450 A1 * | 9/2015 | Micanek | F02B 37/186 |
| | | | 60/602 |
| 2016/0153352 A1 * | 6/2016 | Micanek | F02B 37/186 |
| | | | 415/119 |
| 2016/0298534 A1 * | 10/2016 | Lotz | F02B 37/186 |
| 2017/0226600 A1 * | 8/2017 | Gill | F16K 1/2007 |
| 2017/0248070 A1 * | 8/2017 | Heddy, III et al. | F02B 37/168 |

FOREIGN PATENT DOCUMENTS

| | | | |
|---|---|---|---|
| DE | 197 16 377 A1 | 10/1998 | |
| DE | 10 2007 035340 A1 | 2/2009 | |
| DE | 10 2010 020115 A1 | 11/2011 | |
| EP | 1 387 063 A2 | 2/2004 | |
| EP | 2 821 615 A1 | 1/2015 | |
| JP | 2014088805 A * | 5/2014 | F02B 37/183 |
| WO | WO 2005073606 A1 * | 8/2005 | F02B 37/183 |

OTHER PUBLICATIONS

EP Application No. 16179131.4, Extended European Search Report, dated Nov. 22, 2016 (12 pages).
EP Application No. 16179131.4, Extended European Search Report, dated Nov. 17, 2017 (4 pages).

* cited by examiner

LINKAGE FOR EXHAUST BYPASS VALVE OF MULTI-STAGE TURBOCHARGER

RELATED APPLICATIONS

This application claims priority to and the benefit of a U.S. Provisional Application having Ser. No. 62/194,076, filed 17 Jul. 2015, which is incorporated by reference herein.

TECHNICAL FIELD

Subject matter disclosed herein relates generally to turbomachinery for internal combustion engines and, in particular, to mechanisms for exhaust bypass valves of multi-stage turbochargers.

BACKGROUND

An exhaust bypass valve is often used to control operation of serial turbocharger systems. Such a valve may be operated to physically divert exhaust or alter pressures in exhaust pathways, for example, to direct exhaust flow partially or fully to one of multiple turbines in a system. During operation, a typical exhaust bypass valve experiences high exhaust pressure on one side and lower pressure on the other side. To effectively seal the high pressure environment from the low pressure environment, considerable force is required to maintain contact between a valve and a valve seat. In a sealed state of a valve and valve seat, pressure differentials may challenge one or more inter-component seals and result in detrimental exhaust leakage.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
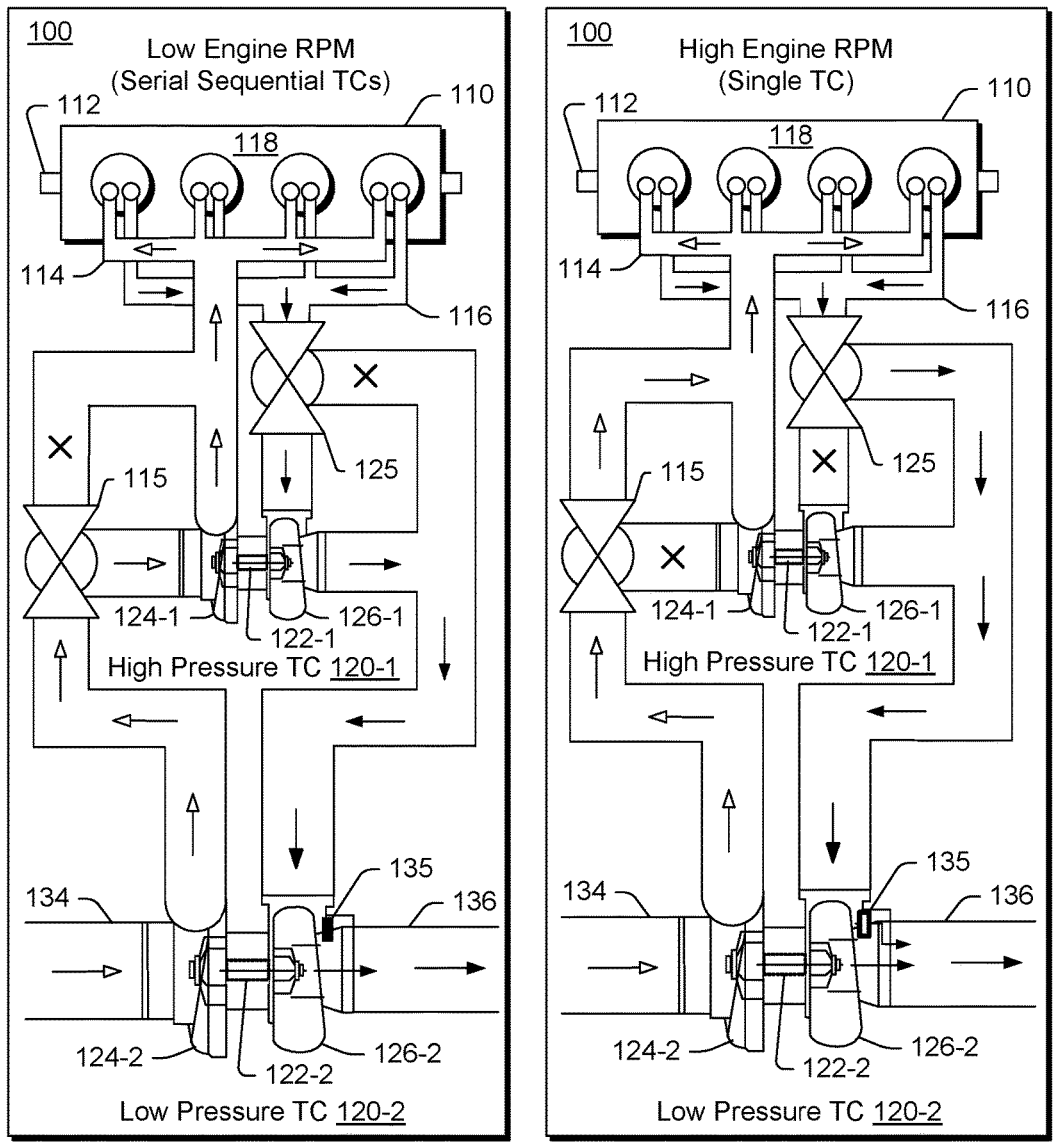
FIG. 1 is a diagram of an example of a system that includes turbochargers and an internal combustion engine along with a controller.

Turbochargers are frequently utilized to increase output of an internal combustion engine. FIG. 1 shows a system 100 in two operational configurations (low engine RPM and high engine RPM) where the system 100 includes an internal combustion engine 110 and turbochargers 120-1 and 120-2 in a serial sequential arrangement.

The internal combustion engine 110 includes an engine block 118 housing one or more combustion chambers that operatively drive a shaft 112 (e.g., via pistons) where rotation of the shaft 112 determines, for example, engine revolutions per minute (RPM). As shown in FIG. 1, an intake manifold 114 provides a flow path for air to the engine block 118 while an exhaust manifold 116 provides a flow path for exhaust from the engine block 118.

Each of the turbochargers 120-1 and 120-2 can act to extract energy from the exhaust and to provide energy to intake air, which may be combined with fuel to form combustion gas. As shown in FIG. 1, each of the turbochargers 120-1 and 120-2 includes a shaft 122-1 and 122-2, a compressor 124-1 and 124-2, and a turbine 126-1 and 126-2. Each of the turbochargers 120-1 and 120-2 may include a housing, which may be referred to as a center housing (e.g., disposed between a respective compressor and turbine). As an example, a turbocharger shaft may be a shaft assembly that includes a variety of components.

As to fluid flow to and from the serial sequential arrangement of turbochargers 120-1 and 120-2, an air intake 134 receives inlet air, which is directed to the compressor 124-2 and an exhaust outlet 136 receives exhaust from the turbine 126-2, which may include an exhaust wastegate valve 135. The wastegate valve 135 can be controlled to allow exhaust to bypass the turbine 126-2. As an example, the turbine 126-2 may optionally include one or more variable geometry mechanisms such as, for example, vanes that can be adjusted to alter shape and/or size of exhaust throats that direct exhaust from a volute to blades of a turbine wheel (e.g., consider a variable nozzle turbine (VNT) or a variable geometry turbine (VGT)).

In the low engine RPM operational state, the turbochargers 120-1 and 120-2 are operated in series, sequentially. Specifically, exhaust from the exhaust manifold 116 is directed first to the turbine 126-1, which causes rotation of the compressor 124-1, and then to the turbine 126-2, which causes rotation of the compressor 124-2. As the turbine 126-1 extracts energy from the exhaust, the exhaust pressure decreases while the compressor 124-1 increases boost pressure (e.g., pressure differential between its inlet and outlet). In the example system 100, based on compressor inlet pressure, the turbocharger 120-1 is referred to as a high pressure turbocharger while the turbocharger 120-2 is referred to as a low pressure turbocharger for the serial sequential operational state. As indicated in FIG. 1, compressed intake air from the compressor 124-2 (e.g., receiving air at atmospheric conditions) is compressed and directed to an inlet of the compressor 124-1 (e.g., receiving the compressed air, which is at a pressure greater than atmospheric). Such an arrangement may be referred to as dual-stage compression.

In the low engine RPM operational state, an air valve 115 may be configured in an orientation that directs compressed air from the compressor 124-2 to the inlet of the compressor 124-1 and an exhaust valve 125 may be configured in an orientation that directs exhaust from the manifold 116 to the turbine 126-1. During operation, either or both of the valves 115 and 125 may be regulated. For example, the valve 115 may be regulated such that at least some intake air bypasses the compressor 124-1 and the valve 125 may be regulated such that at least some exhaust bypasses the turbine 126-1. Such regulation may occur while the system 100 is maintained in a serial sequential operational state. In contrast, when the air valve 115 is configured in an orientation that causes full or substantial bypass of the compressor 124-1 and when the exhaust valve is configured in an orientation that causes full or substantial bypass of the turbine 126-1, the system 100 operates fully or essentially as a single turbocharger system. Such an operational state is typically selected for high engine RPM.

As the high engine RPM operational state relies on the turbocharger 120-2 and as high engine RPM logically follows low engine RPM, regulation of the exhaust valve 125 can act to pilot the low pressure turbocharger 120-2. For example, when a preset engine RPM or boost pressure is reached, a controller may actuate the exhaust valve 125 to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

The system 100 may also include other features, for example, a heat exchanger (e.g., or heat exchangers) may be positioned to cool compressed intake air prior to delivery of the compressed air to the combustion chambers of the engine 110. As an example, a heat exchanger may include a water-cooled compressor housing. As described herein, the system 100 may include one or more exhaust gas recirculation paths that can circulate exhaust to intake air; noting that exhaust valves and intake valves for combustion chambers of the engine 110 may be appropriately controlled to achieve some degree of exhaust "recirculation" (e.g., retention in a chamber).

In FIG. 1, an example of a controller 190 is shown as including one or more processors 192, memory 194 and one or more interfaces 196. Such a controller may include circuitry such as circuitry of an engine control unit. Such a controller may include circuitry that provides for reading, writing or reading and writing information (e.g., executable instructions, control instructions, data, etc.) to memory (e.g., a computer-readable storage medium). As described herein, various methods or techniques may optionally be implemented in conjunction with a controller, for example, through control logic. Control logic may depend on one or more engine operating conditions. For example, sensors may transmit information to the controller 190 via the one or more interfaces 196. Control logic may rely on such information and, in turn, the controller 190 may output control signals to control engine operation. The controller 190 may be configured to control an air valve (see, e.g., the air valve 115), an exhaust valve (see, e.g., the exhaust valve 125), a variable geometry assembly, a wastegate (see, e.g., the wastegate 135), an electric motor, or one or more other components associated with an engine, an exhaust turbine (or exhaust turbines), a turbocharger (or turbochargers), etc. With respect to valves, the controller 190 may be configured to act as an actuator or to transmit a signal to an actuator configured to actuate, for example, the air valve 115, the exhaust valve 125, the wastegate valve 135 (e.g., to close or open a wastegate), etc.

Figure 2:
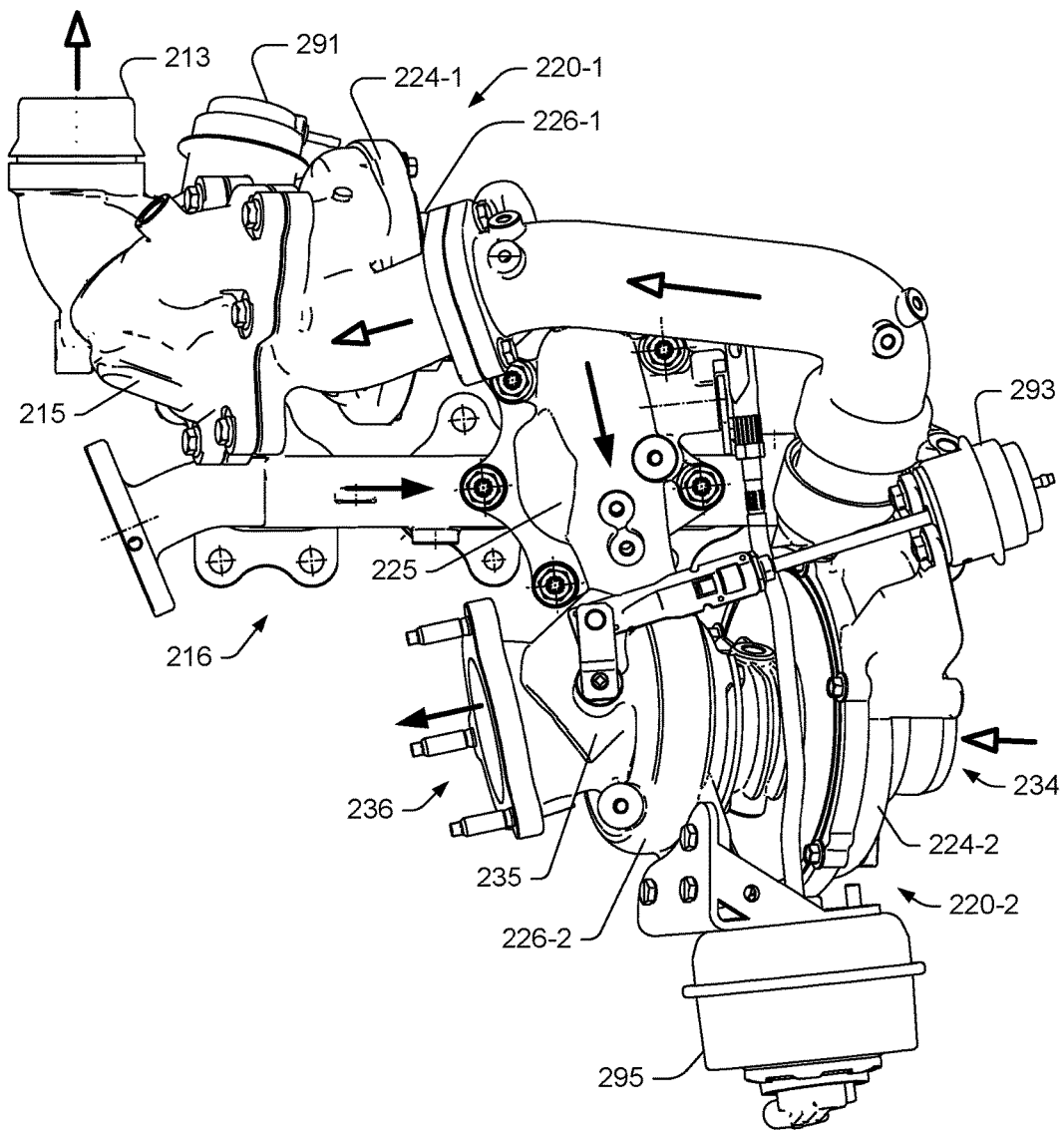
FIG. 2 is a perspective view of an example of a serial sequential turbocharger system.
Figure 3:
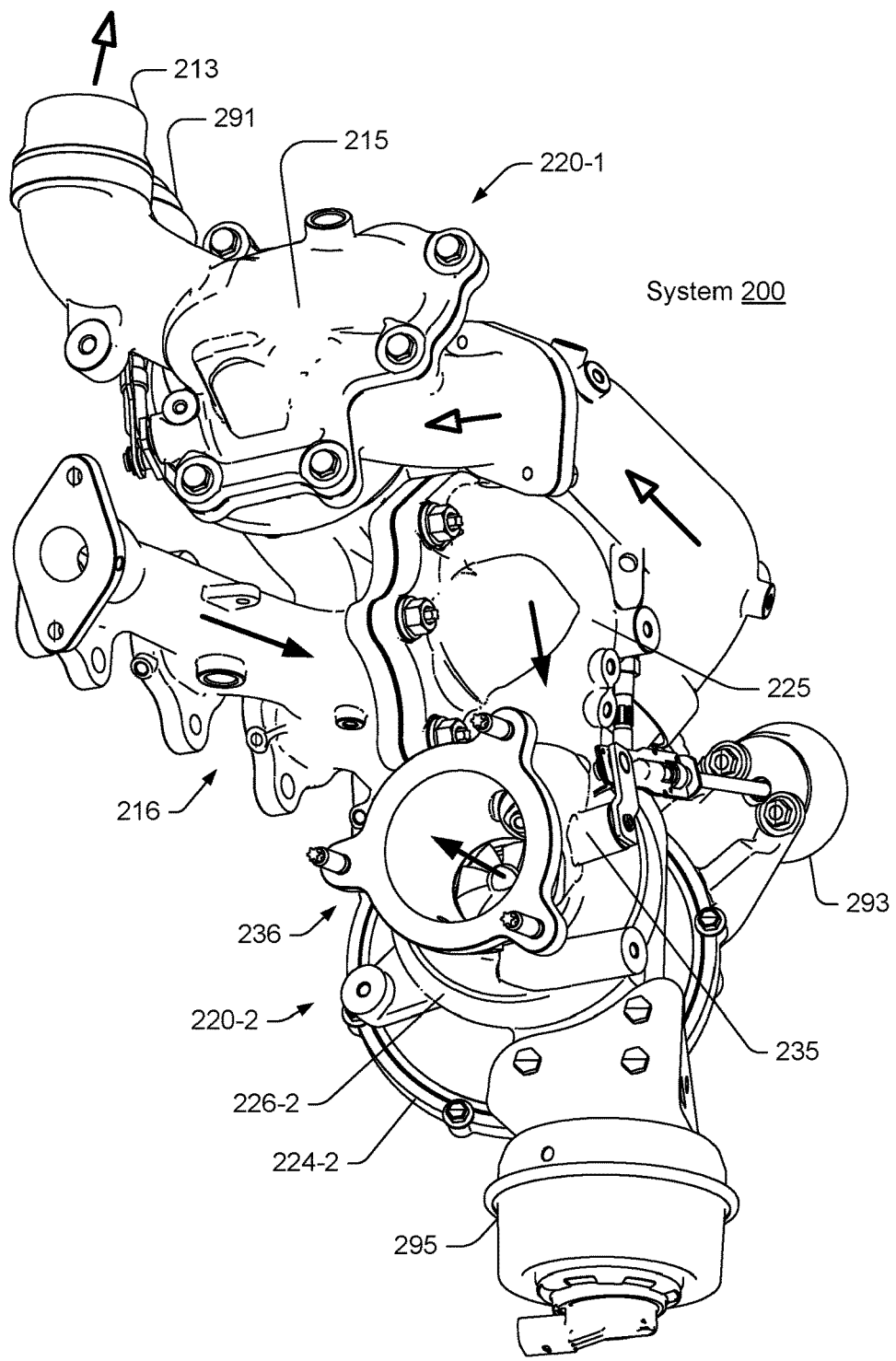
FIG. 3 is another perspective view of the serial sequential turbocharger system of FIG. 2.

FIGS. 2 and 3 show perspective views of a system 200 with two turbochargers 220-1 and 220-2 along with an air outlet 213, an air valve 215, an exhaust manifold 216, an exhaust valve 225, a wastegate 235, an air intake 234, an exhaust outlet 236, an air valve actuator 291, a wastegate actuator 293 and an exhaust valve actuator 295. Open headed arrows indicate intended air flow directions while solid headed arrows indicate intended exhaust flow directions. Each of the turbochargers 220-1 and 220-2 includes a compressor 224-1 and 224-2 and a turbine 226-1 and 226-2.

As described herein, a system capable of serial sequential turbocharger operation and single turbocharger operation may be arranged in any of a variety of manners. For example, an exhaust valve may be located in a variety of positions depending on number, shape and size of exhaust conduits. In general, an exhaust valve acts to cause flow of exhaust predominantly to a larger of the turbochargers, which is often referred to as a low pressure turbocharger in a serial sequential arrangement. As mentioned, an exhaust valve may act to physically bypass a smaller, high pressure turbocharger or it may act to alter pressure in pathways. As to the latter, with reference to the system 200, the exhaust valve 225 may be located adjacent the exhaust manifold 216 such that upon opening of the valve 225, exhaust flows along a lower pressure pathway to the larger turbine 226-2 of the low pressure turbocharger 220-2. In such an arrangement, the exhaust valve 225 can regulate exhaust flow form a high pressure source (e.g., manifold) to a lower pressure pathway.

As described herein, exhaust valve regulation may occur such that an exhaust valve is closed, open or in any intermediate state. In general, an exhaust valve opens in a direction facilitated by a pressure differential and closes in a direction opposed to the pressure differential. Such a valve arrangement provides for easier opening (e.g., less actuator force to open). An exhaust valve should be capable of effectively closing an exhaust opening (e.g., overcoming pressure differentials) such that, for low engine RPM, exhaust is directed to the smaller turbine.

Figure 4:
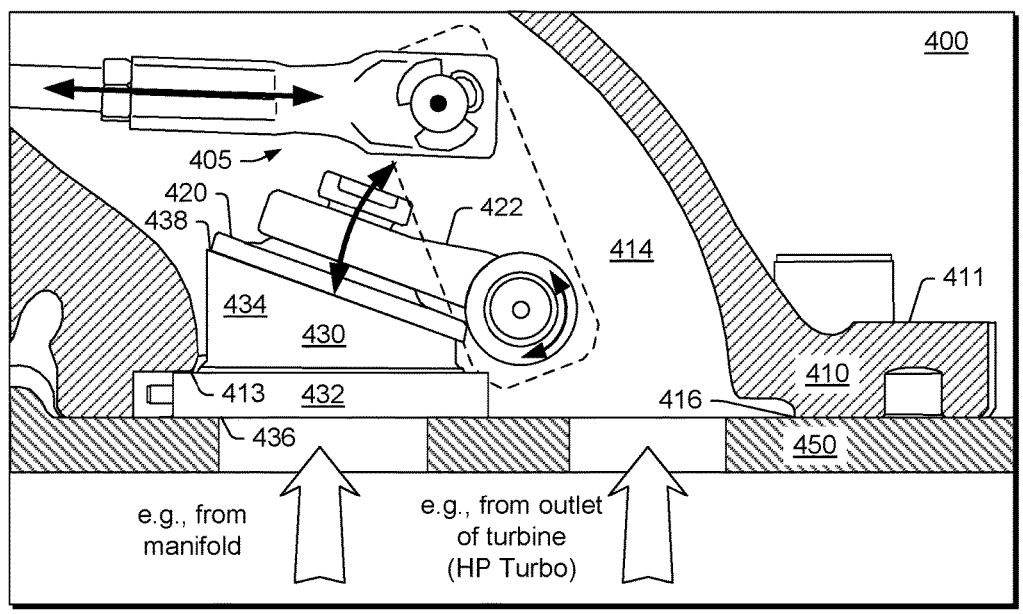
FIG. 4 is a cross-sectional view of an example of an exhaust bypass valve assembly.

FIG. 4 shows an example of an exhaust valve assembly 400 that may receive exhaust, for example, from a manifold and from an outlet of a turbine of a high pressure turbocharger (see, e.g., FIGS. 1, 2 and 3). For example, the assembly 400 includes a housing 410 with an exhaust inlet flange 411 configured to be operatively coupled to another component (e.g., or components) for receipt of exhaust. As shown in FIG. 4, the housing 410 defines a chamber 414 configured for receipt of exhaust, in part, responsive to position of a poppet 420 (e.g., a valve or valve plug), which is attached to and movable by an arm 422, where the arm 422 may be attached to or linked to an actuator (see, e.g., actuator assembly 405). As shown, a poppet can act as a plug, for example, to plug or seal an opening (e.g., to plug or seal an opening to an exhaust manifold coupled to an internal combustion engine).

In the example of FIG. 4, the assembly 400 includes a valve seat 430 disposed between the housing 410 and another component 450, which may be a part of a manifold, attached to a manifold, etc. As shown, the valve seat 430 includes a base portion 432 and a wall portion 434 that extends axially away from the base portion 432 (e.g., as a pipe, cylindrical wall, etc.). Where the base portion 432 and the wall portion 434 include substantially circular cross-sections, the base portion 432 can include an outer diameter that exceeds an outer diameter of the wall portion 434. An exhaust passage is defined by an inner surface of the valve seat 430, which may be a substantially cylindrical surface.

In the example assembly 400 of FIG. 4, the housing 410 includes a recess 413 that extends axially inwardly from a face 416 of the housing 410 (e.g., optionally including one or more shoulders, etc.) and that can receive the valve seat 430. In the example assembly 400 of FIG. 4, the valve seat 430 includes a surface 436 and a surface 438, which is disposed at an angle, for example, defined relative to the surface 436, a planar surface of the component 450, the face 416 of the housing 410, etc., upon which the poppet 420 may be seated when the poppet 420 is in a closed state. Such an angle (e.g., a swing angle) may reduce a rotational angle when moving the poppet 420 between an open state and a closed state. As an example, a valve seat may include a surface to seat a poppet where the surface is disposed in an assembly at an angle of about zero degrees. For example, consider the valve seat 430 as having the surface 438 being parallel to the surface 436, which may result in a greater travel distance (e.g., angle of rotation) for the arm 422 to seat the poppet 420 against the surface 438. In such an example, a lower surface of the poppet 420 may be about parallel to the interface between the housing 410 and the component 450 (e.g., and about parallel to a plane of a gasket or gaskets disposed between the housing 410 and the component 450). As an example, an angle may be considered in a force diagram, for example, to consider force applied to a valve seat by a poppet and balance of that force (e.g., as to one or more components that are in directly or indirectly in contact with the valve seat).

Figure 5:
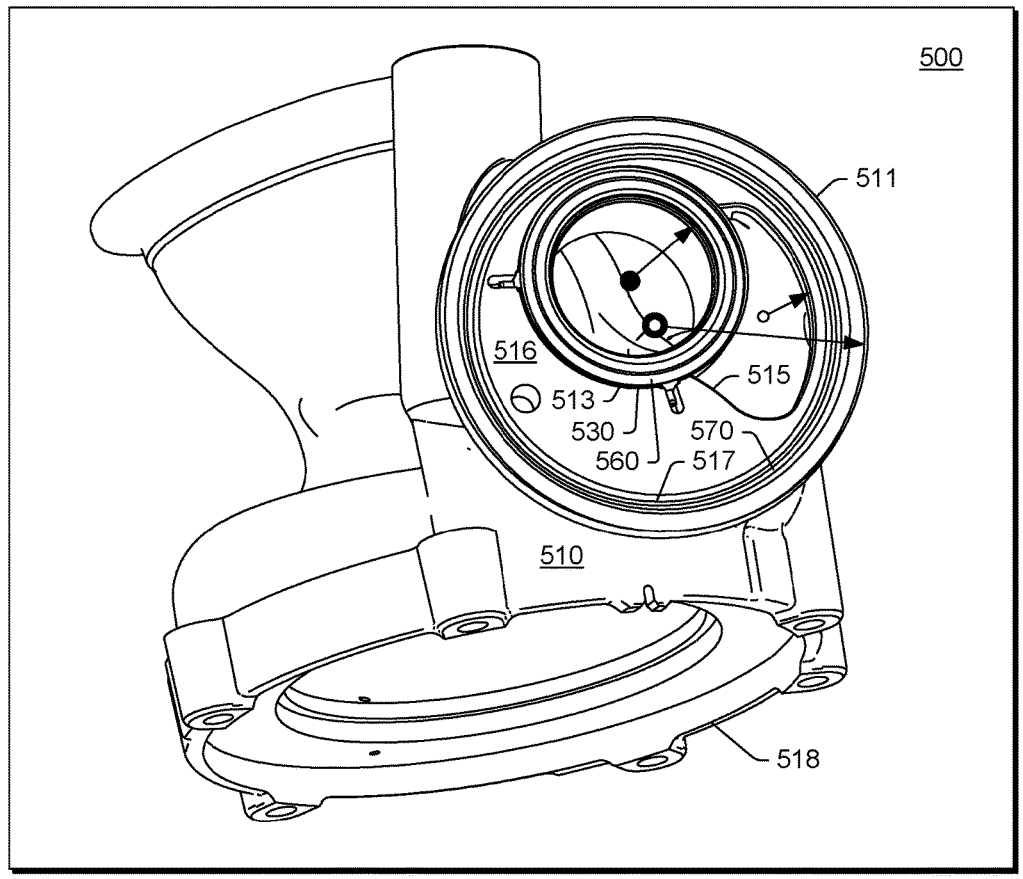
FIG. 5 is a perspective view of an example of an exhaust bypass valve assembly.

FIG. 5 shows a perspective view of an assembly 500 that includes a housing 510, a valve seat 530, a gasket 560 and a gasket 570. In the example of FIG. 5, the housing 510 includes an exhaust inlet flange 511 configured for connection to another component for receipt of exhaust and a housing flange 518 for operatively coupling the housing 510 to, for example, a center housing of a turbocharger. As shown in the example of FIG. 5, the housing flange 518 includes an opening for receipt of a turbine (e.g., a turbine wheel) where, for example, exhaust entering via the exhaust inlet flange 511 may flow to a volute defined by the housing 510 to be directed to the turbine (e.g., and then axially outwardly from the turbine to an exhaust outlet of the housing 510).

In the example of FIG. 5, the housing 510 includes a recess 513, a face 516 and a recess 517 as well as an edge 515 that defines an opening for flow of exhaust (e.g., from an outlet of a high pressure turbine). In the example assembly 500 of FIG. 5, the gasket 560 is seated on the valve seat 530, which is received by the recess 513 of the housing 510, and the gasket 570 is seated in the recess 517 of the housing 510. As an example, the gasket 560 may include a V-shaped cross-section formed by a single piece or multiple pieces where the V-shaped cross-section is open about an inner perimeter and closed about an outer perimeter. As an example, a closed side of a V-shaped cross-section of the gasket 560 may be formed by a joint between two pieces such as an upper piece and a lower piece. As an example, the joint may be formed upon application of clamping force (e.g., by joining two components with the two pieces of the gasket therebetween) or, for example, the joint may be formed by welding or other process to join two pieces (e.g., in a manner where a seal is formed therebetween).

Figure 6:
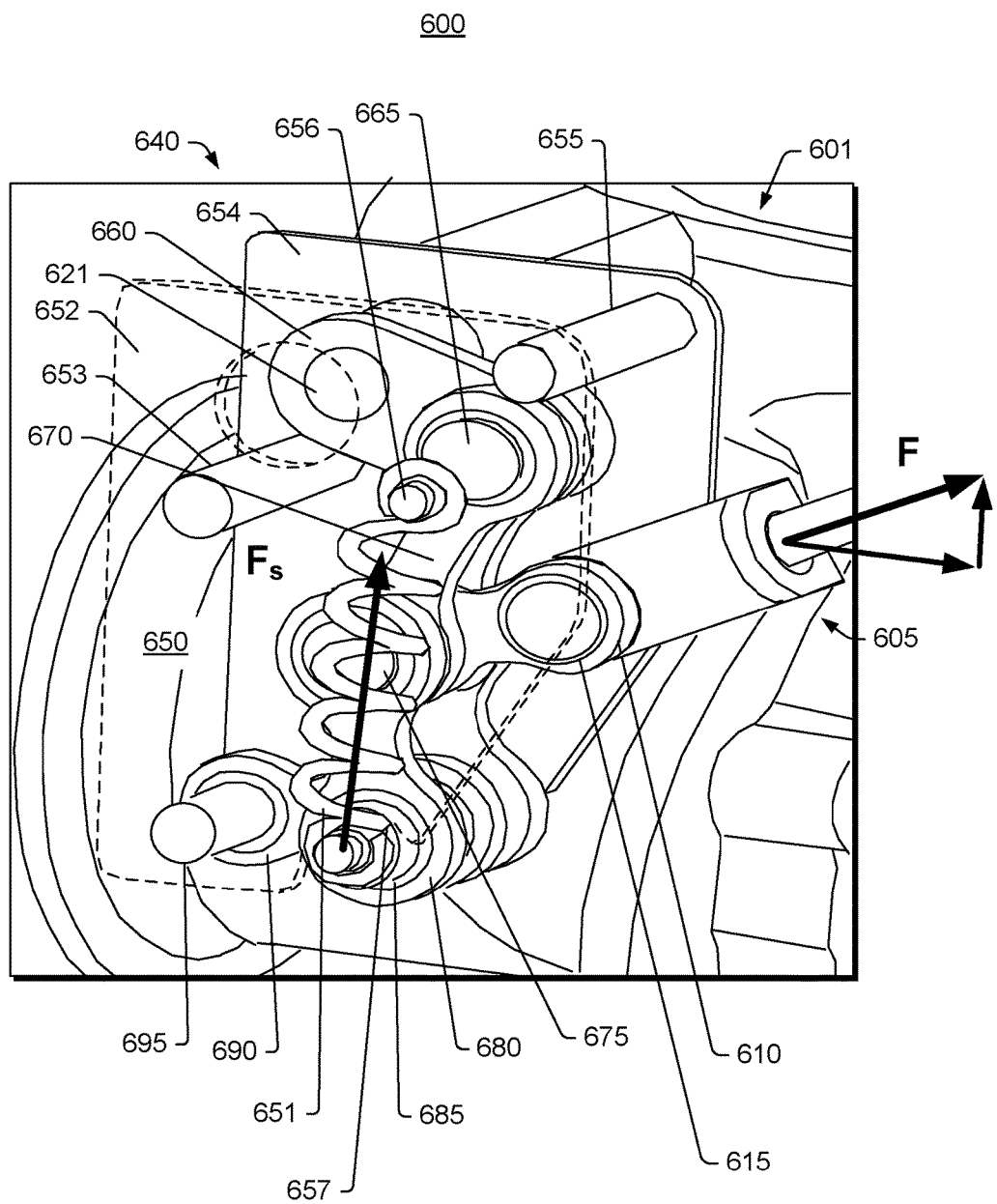
FIG. 6 is a perspective view of an example of an assembly.

FIG. 6 shows an example of an assembly 600 that includes a housing 601, an actuator 605 with a link 610 to a linkage mechanism 640 that includes a casing 650, a link 660, a link 670, a link 680 and a link 690. As shown in the example of FIG. 6, the link 660 is a single bar link, the link 670 is a multi-bar link, the link 680 is a multi-bar link, the link 690 is a single bar link, and an actuator link 610 is a single bar link. As an example, the linkage mechanism 640 may be attached to the housing 601 via one or more attachment mechanisms (e.g., optionally via a fitting as to a portion of the housing about a bore for a shaft that controls a bypass valve).

As shown in the example of FIG. 6, the casing 650 includes substantially parallel plates 652 and 654 that are spaced by a first rod 653, a second rod 655 and a third rod 695 where the third rod 695 is an axle for the link 690. The plates 652 and 654 can include a shaped portion 657 (e.g., a shaped notch, etc.), for example, to accommodate coupling of a spring 651 (e.g., a biasing element) to the axle 685 and to a post 656 that is fixed to the plate 652; noting that the plate 654 can include an opening to receive a shaft 621 of a bypass valve. As an example, the plate 652 may act to position the axle 685 where the spring 651 applies a tension force to the axle 685. For example, the axle 685 may be seated in the shaped portion 657 of an edge of the plate 652. In such an arrangement, the linkage mechanism 640 may be positioned in a locked state (e.g., akin to locking pliers). As an example, the spring 651, the post 656 and the shaped portion 657 (e.g., cut-out region, etc.) may be replicated or otherwise arranged on the other side and/or on both sides of the linkage mechanism 640.

As an example, the axle 685 may be a floating axle (e.g., a floating pivot) that is at least in part biased by one or more spring elements. In such an arrangement, the one or more spring elements may act to compensate for one or more of mechanism wear, thermal expansion, and construction of the mechanism as a cartridge assembly. As an example, a biasing mechanism may apply force to the axle 685 directly or, for example, via contact with one or more of the links (e.g., consider a spring assembly that is seated below the axle 685 and in contact with a link or links of the multi-bar link 680 and/or the link 690).

The link 660 has as one axle, the shaft 621 of a bypass valve where the link 660 is fixed to the shaft 621. As such, rotation of the link 660 (e.g., a control arm) causes the shaft 621 to rotate to open or close a bypass valve housed by the housing 601. The linkage mechanism 640 also includes axles 665, 675, and 685. As shown in the example of FIG. 6, the linkage mechanism 640 can include one or more springs 651 and, for example, one or more viscous coupling components (e.g., consider one or more spring elements and/or one or more dashpot elements). In the example of FIG. 6, the spring 651 is operatively coupled to the axle 685 and to the post 656, with an applied tension (e.g., the spring 651 acts to draw the axle 685 toward the post 656). Such tension may be sufficient to maintain the bypass valve in a closed position with respect to exhaust pressure force it experiences during operation.

As shown in FIG. 6, the actuator 605 is positioned with a linear control rod that moves at an angle with respect to a line drawn between the axles 665 and 685. The linear control rod may be defined as including a zero displacement point that corresponds to a closed state of the bypass valve where a negative displacement can transition the linkage mechanism 640 to the locked state (e.g., a closed and locked state) and where a positive displacement can transition the linkage mechanism 640 to achieve an open state of the bypass valve. In the example of FIG. 6, the linear control rod of the actuator 605 may apply a force that is a pulling force (e.g., "F"), for example, with a component in a direction generally upwardly (e.g., vertically) in the perspective view of FIG. 6 (see, e.g., approximate force component direction arrows).

While there may be a relatively small force component for an actuator rod where such a force component is substantially perpendicular to the axial force F (e.g., aligned along the longitudinal axis of the rod) due to the angle between the actuator rod and link rod 610, a closing force acting on a valve (e.g., a poppet mechanism) is applied via the actuator axial force (F) and via tension of the spring 651 (e.g., a biasing mechanism). As an example, a biasing mechanism may implement one or more springs, which may include, for example, one or more coned washers and/or one or more other types of biasing elements.

In the example of FIG. 6, the bypass valve may be pressured by exhaust pressure in a direction that acts to force the bypass valve to an open position. To help to maintain the bypass valve in a closed position, the spring 651 or springs may exert force (e.g., "$F_s$"). In a locked state, the spring 651 may also act to bias the axle 685 with respect to the post 656 and thereby reduce force required by the actuator 605 to maintain the bypass valve in the closed position (e.g., consider the actuator 605 being in a resting state, low power consumption state, a substantially zero power consumption state, etc.).

The linkage mechanism 640 may be viewed as including a knee formed by the links 670 and 680 about the axle 675, for example, where the links 670 and 680 form an upper leg and a lower leg with respect to the knee. In furtherance of this analogy, the link 690 may be viewed as a foot where the axle 685 is an ankle. In such an example, the link 690 is fixed at one end by the axle 695. In the example of FIG. 6, the actuator 605 can cause the knee to bend to the left, which can cause rotation of the shaft 621 via clockwise rotation of the link 660. In such a manner, the bypass valve can open (e.g., where a force balance may account for exhaust pressure force, spring force, etc.).

A knee with a fixed ankle may allow for "centering", which may, for example, relieve pressure on an actuator. Such an approach tends to operate for a perfectly sized and perfectly articulating knee mechanism. If not perfect, then reaching the center position may be problematic, or when in the center position, a bypass valve may not be sufficiently in a closed position. Moreover, even where the linkages are constructed so that the bypass valve is sufficiently closed when the linkage is in a perfectly aligned position, if an actuator moves slightly beyond center, the bypass valve will start to open again.

A linkage mechanism such as, for example, the linkage mechanism 640 of FIG. 6, can be more robust. For example, the "foot" link 690 allows upper and lower leg links 670 and 680 of the linkage mechanism 640 to go slightly beyond center to the right in FIG. 6 (e.g., though the "ideal position" may still be the centered position in which the intermediate linkages 670 and 680 are aligned). As mentioned, the spring 651 can bias the axle 685 upwardly to maintain the linkage mechanism 640 in a locked state. To release the linkage mechanism 640 from the locked state, the actuator 605 can apply force as it moves from a negative displacement position toward a zero displacement position and, to open the bypass valve, to a positive displacement position.

Figure 7:
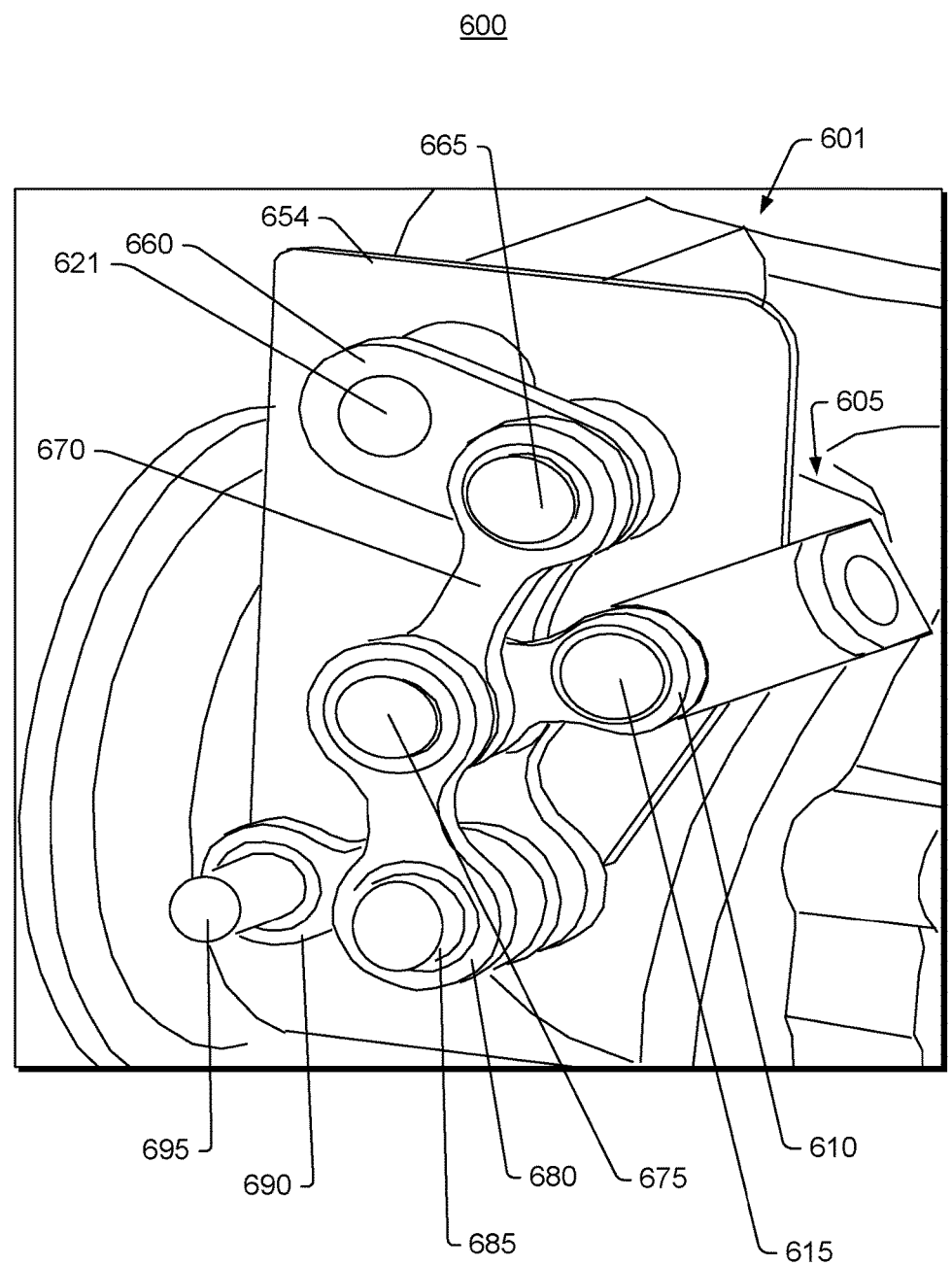
FIG. 7 is a perspective view of a portion of the assembly of FIG. 6.

FIG. 7 shows an example of the assembly 600 with the outer plate 652 removed to show an arrangement of the links 610, 660, 670, 680 and 690 along with axles or pivot points 615, 621, 665, 675, 685 and 695 where, as mentioned, the axle 685 (e.g., pivot point) can be floating and biased via one or more biasing mechanisms. As mentioned, the axle 685 can be akin to an ankle in an upper leg, knee, lower leg, ankle and foot analogy.

Figure 8:
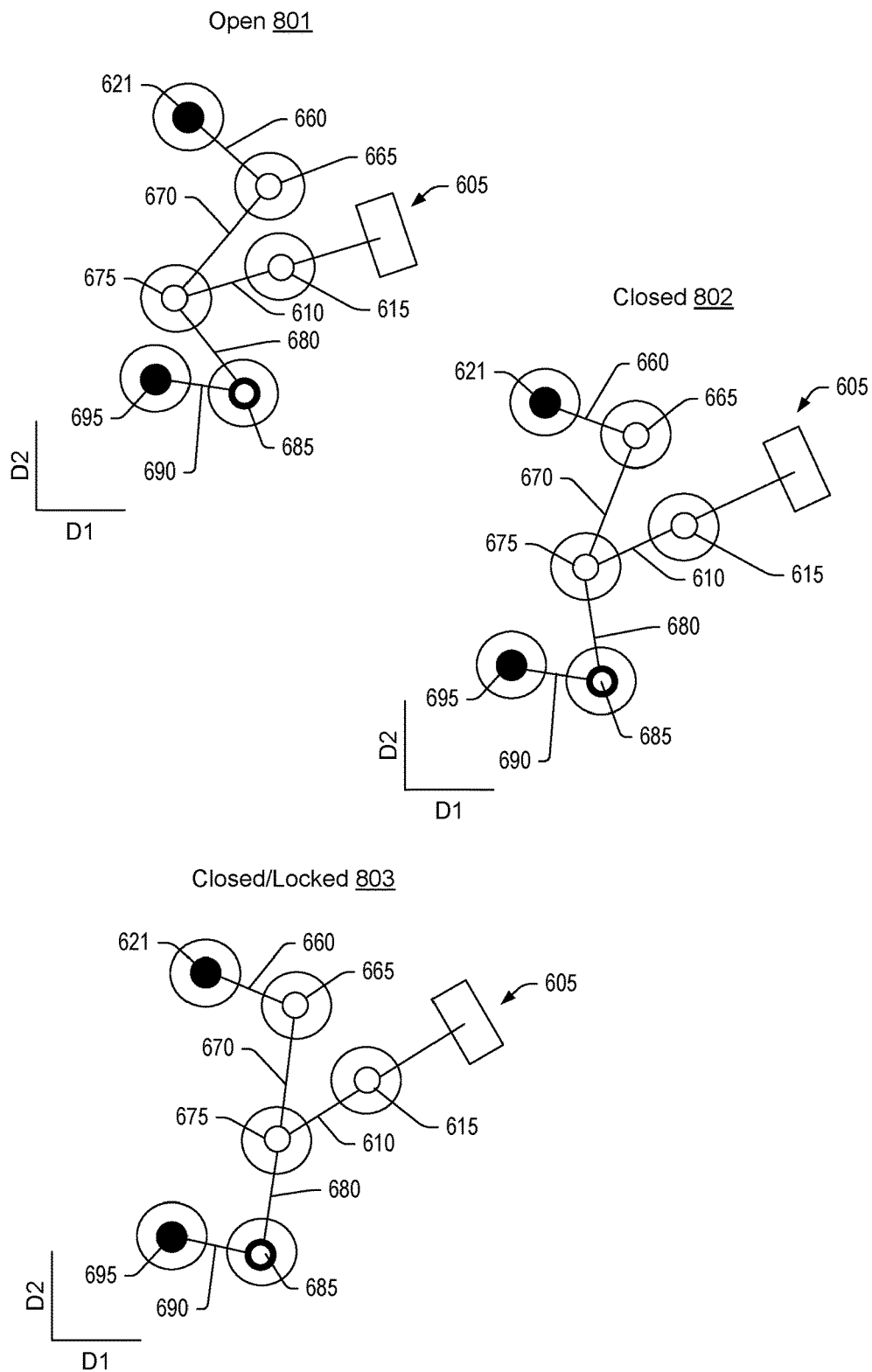
FIG. 8 is a diagram of examples of states.

FIG. 8 shows an open state 801, a closed state 802 and a closed and locked state 803 of an assembly such as the assembly 600. As an example, the open state 801 and the closed state 802 may be considered to be unlocked states where, for example, a linkage mechanism is not locked in a manner whereby an actuator operatively coupled thereto may be optionally powered down (e.g., shut off). As an example, where an actuator is supplied with power, it may act to transition a linkage mechanism from one state to another state (e.g., from a locked state to an unlocked state or vice-versa). Where power is supplied to an actuator, the actuator may transition an exhaust valve from an open state to a closed state and vice-versa, for example, consider the open state 801 and the closed state 802; noting that the actuator may also transition from an unlocked state to the closed locked state 803 or from the closed and locked state 803 to an unlocked state.

In the examples of FIG. 8, the states 801, 802 and 803 are shown in an approximate two-dimensional side view with respect to coordinates D1 and D2, which may be orthogonal (e.g., x, y in a Cartesian coordinate system). As an example, a linkage mechanism may be defined at least in part via a diagram that may include axes that define distances. For example, the assembly 600 of FIG. 6 may be defined at least in part via a diagram in a two-dimensional x,y coordinate system where one or more axles may be at fixed positions and where one or more axles may be at movable positions, for example, movable due to actuation of an actuator. As an example, movement of a position of an axle in a two-dimensional x,y coordinate system can correspond to rotational motion of another axle, which may be a shaft of a valve or which may be operatively coupled to a shaft of a valve.

In the example states 801, 802 and 803, a filled circle represents a fixed pivot point or axle and an open circle represents a movable pivot point or axle, noting that an open circle with a thick line represents a biased, floating pivot point or axle, which corresponds to the axle 685 of the example assembly 600. As to a knee analogy, in the open state 801, the knee is bent, in the closed state 802 the knee may be slightly bent and in the closed and locked state 803, the knee is locked, optionally slightly hyper-extended. In FIG. 8, the states 801, 802 and 803 and transitions therebetween may be controlled via the actuator 605 such that a valve may be opened, closed and closed and locked.

As to a closed and locked state, such a state may be utilized where operational conditions, performance demand, etc., of a turbocharger system of an internal combustion engine does not benefit from opening of a valve. For example, a vehicle traveling on a highway at a posted speed (e.g., from about 60 kpm to about 160 kph or more while, for example, in a gear such as an overdrive gear that can allow for lower engine RPM operation) may be in a relatively steady state where a valve can remain closed and locked. As an example, in the closed and locked state, power to an actuator may be reduced or the actuator may be shut-off. In such an example, electrical power demand may be reduced and, for example, actuator life may be extended. In such an example, the actuator may be at a cooler temperature compared to a scenario where electrical power is supplied to the actuator (e.g., which may be at least in part dissipated as heat energy that heats the actuator). As an example, an assembly may be configured such that an actuator may be utilized with a smaller force rating than an actuator for an assembly that does not include a multi-link and axle unit such as shown in FIG. 6.

As an example, where a change in demand occurs, an actuator may be actuated (e.g., via electrical power) to transition from a closed and locked state to another state, which may be, for example, a closed and unlocked state or an open state. For example, one or more types of changes in demand may be associated with driving conditions, traffic signals, grade, etc. As an example, an actuator may optionally open a valve according to a control scheme that may be based on one or more factors (e.g., demand, pressure, etc.).

As mentioned with respect to FIG. 1, regulation of the exhaust valve 125 can act to pilot the low pressure turbocharger 120-2. For example, when a preset engine RPM or boost pressure is reached, a controller may actuate the exhaust valve 125 (e.g., transition to an open state or more open state) to increase flow of exhaust to the turbine 126-2 (e.g., via physical diversion or pressure differential). In such a scenario, the increased flow to the turbine 126-2 increases rotational speed of the shaft 122-2, which prepares the turbocharger 120-2 for a more rapid response and power output (e.g., with minimum turbo lag) upon configuration of the exhaust valve 125 in an orientation that causes full or significant bypass of the turbine 126-1.

As an example, a cartridge approach to a linkage mechanism can help to decouple the linkage mechanism from thermal energy of a housing that includes one or more exhaust passages. In such an approach, temperature gradients and temperature maxima may be reduced, which can thereby reduce changes in components of a linkage mechanism, for example, due to thermal expansion and/or thermal contraction (e.g., as to component clearances, forces, etc.). As an example, components of a linkage mechanism may be built and assembled with smaller clearances where thermal effects are reduced. Such an approach may also help to make transfer of force more efficient (e.g., consider stack-up, etc.).

As an example, a floating axle that is biased via a biasing mechanism can help to protect a kinematic linkage from various contact pressure effects and may allow for self-locking, for example, power may be shut down to an actuator when running under conditions where a valve (e.g., a poppet, etc.) is closed, which may be more than 50 percent of a duty cycle.

Figure 9:
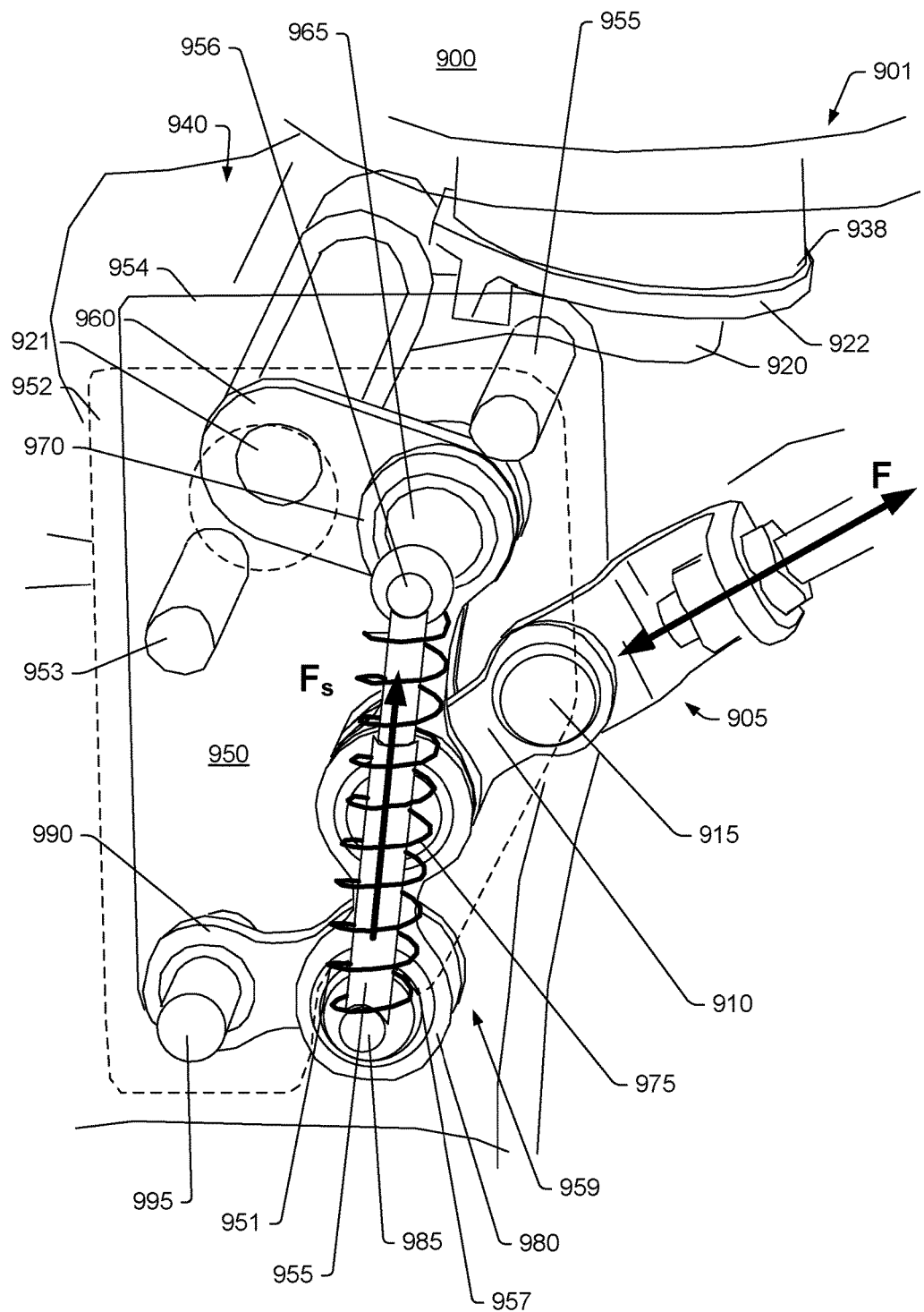
FIG. 9 is a perspective view of an example of an assembly.

FIG. 9 shows an example of an assembly 900 that includes a housing 901, an actuator 905 with a link 910 to a linkage mechanism 940 that includes a casing 950, a link 960 (e.g., a shaft link), a link 970 (e.g., an upper intermediate link), a link 980 (e.g., a lower intermediate link) and a link 990 (e.g., a lower end link). As shown in the example of FIG. 9, the link 960 is a single bar link, the link 970 is a multi-bar link, the link 980 is a multi-bar link, the link 990 is a single bar link, and an actuator link 910 is a single bar link (e.g., that pivots to accommodate that the axle 915, which can travel outside the axis of the control rod of the actuator 905). In such an example, the multi-bar links may be implemented to maintain planarity (e.g., substantially planar alignment) of portions of the linkage mechanism 940. For example, a knee defined by an upper leg and a lower leg may be maintained in a substantially planar arrangement via use of multi-bar links for the upper leg and for the lower leg.

As shown, the casing 950 includes substantially parallel plates 952 and 954 that are spaced by a first rod 953, a second rod 955 and a third rod 995 where the third rod 995 is an axle for the link 990. The plates 952 and 954 can each include a respective notch 957 and 959 (hidden). The plate 952 is shown in dashed lines to indicate that it is transparent in FIG. 9 to allow for illustration of various components. In FIG. 9, various features of the housing 901 are shown with solid lines, which may be internal features of the housing 901 or the assembly 900; noting, again, that the view of FIG. 9 is in part a transparent view for purposes of illustrating various features.

As explained with respect to the assembly 600 of FIG. 6, one or more biasing elements (e.g., springs) may act to bias a linkage. For example, in FIG. 9, the plate 952 includes a post 956 (e.g., or other attachment point, etc.) for a spring 951 that can bias the axle 985 (see, e.g., the force $F_s$). The actuator 905 may move an actuator rod with a force that may vary, for example, depending on control action to be achieved. The actuator rod may be defined to include a zero point that corresponds to a closed state of a bypass valve 920 where a locked state of the linkage mechanism 940 may be achieved for negative displacements from the zero point and where an open state of the bypass valve 920 may be achieved for positive displacements from the zero point.

As shown in FIG. 9, the link 960 has as one axle, a shaft 921 of the bypass valve 920 where the link 960 is fixed to the shaft 921. As such, rotation of the link 960 (e.g., control arm) causes the shaft 921 to rotate to open or close the bypass valve 920 housed by the housing 901. As shown in a transparent view of the housing 901, the bypass valve 920, which is in a closed position or orientation, includes a plug portion 922 that can seat against a valve seat 938 (e.g., as supported by the housing 901, as part of a housing, etc.). The linkage mechanism 940 also includes axles 965, 975, and 985 (e.g., "floating" axles); noting that the axle 985 may be seated in the notches 957 and 959 of the plates 952 and 954, respectively.

As shown in the example of FIG. 9, the linkage mechanism 940 can include one or more springs 951 and, for example, one or more viscous coupling components 955 (e.g., consider one or more spring elements and/or one or more dashpot elements). As an example, a viscous coupling component may be a shock absorber that acts to damp motion (e.g., vibration, changes, etc.). As mentioned, in the example of FIG. 9, the spring 951 is operatively coupled to the axle 985 and to the post 956, with an applied tension (e.g., the spring 951 acts to draw the axle 985 toward the post 956) and the viscous coupling component 955 may be disposed akin to a strut aligned with a longitudinal axis of the spring 951 (e.g., the component 955 may be coupled to the post 956). As an example, a linkage mechanism can include one or more coil springs and one or more dampers (e.g., viscous elements). A shock absorber may be a mechanical, hydraulic or other device designed to absorb and damp shock impulses. Such an element may convert kinetic energy of a shock into another form of energy (e.g., heat) which may be dissipated. A shock absorber can be considered as a type of dashpot. As an example, a damper or dampers may damp actions that may occur in transitioning from a locked state to an unlocked state and vice-versa.

Figure 10:
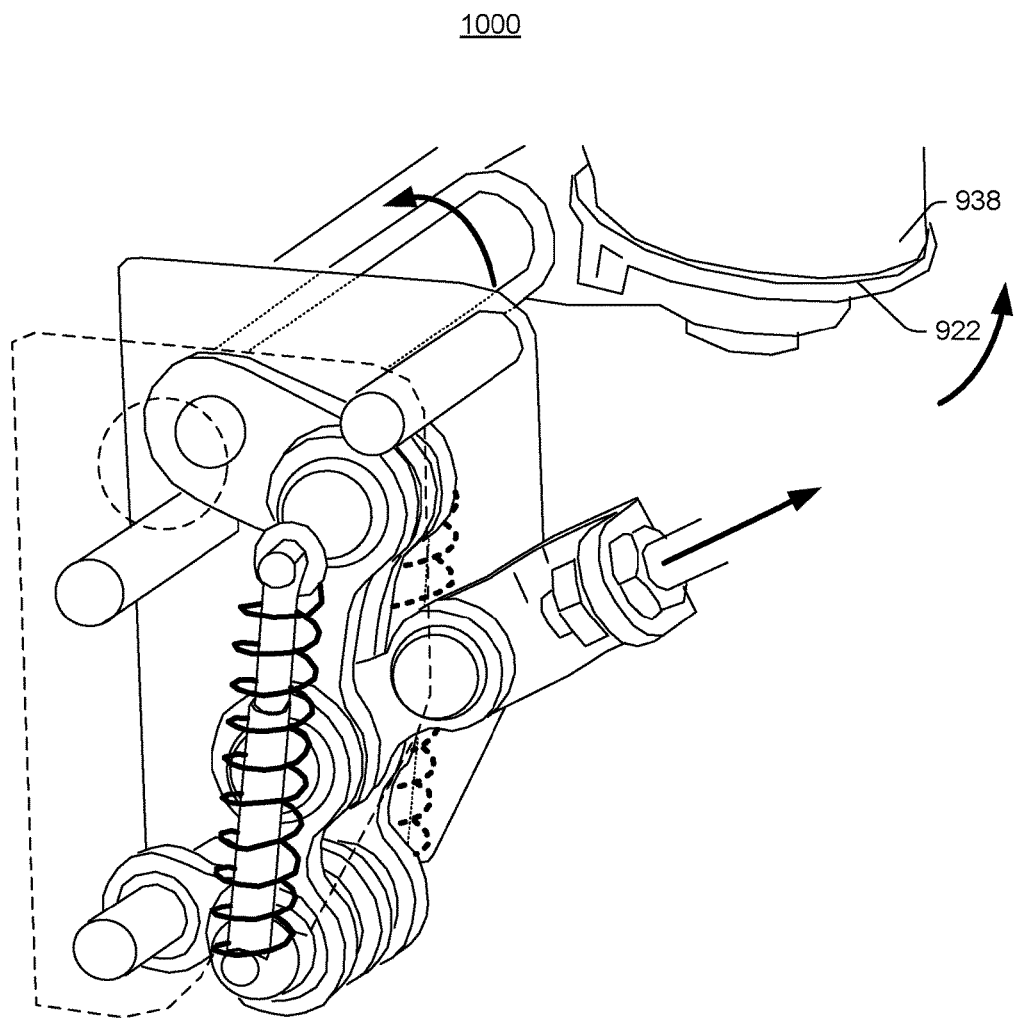
FIG. 10 is a perspective view of the assembly of FIG. 9 in an example state.
Figure 11:
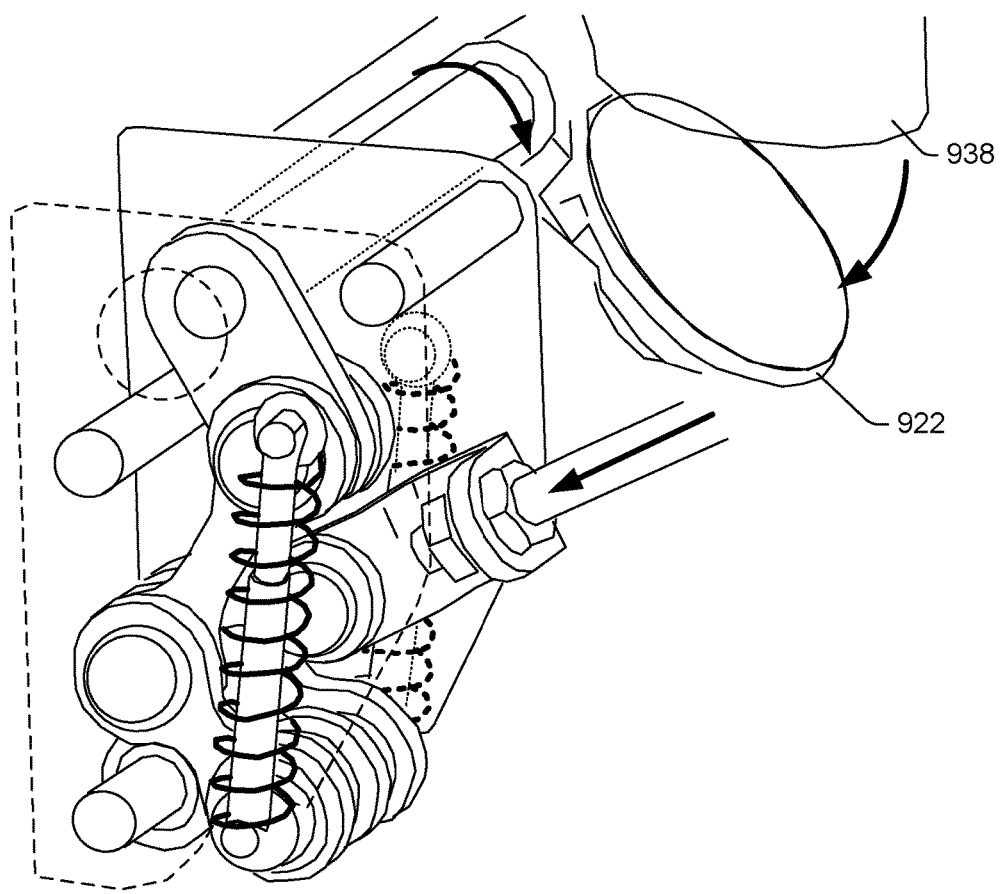
FIG. 11 is a perspective view of the assembly of FIG. 9 in an example state.

FIGS. 10 and 11 show an assembly with a bypass valve in a closed state 1000 (e.g., closed position, closed orientation, etc.) and in an open state 1100 (e.g., open position, open orientation, etc.), respectively. In the views of FIGS. 10 and 11, dampers are illustrated, which couple to an axle and to a post on respective sides. Such dampers can be optional.

Figure 12:
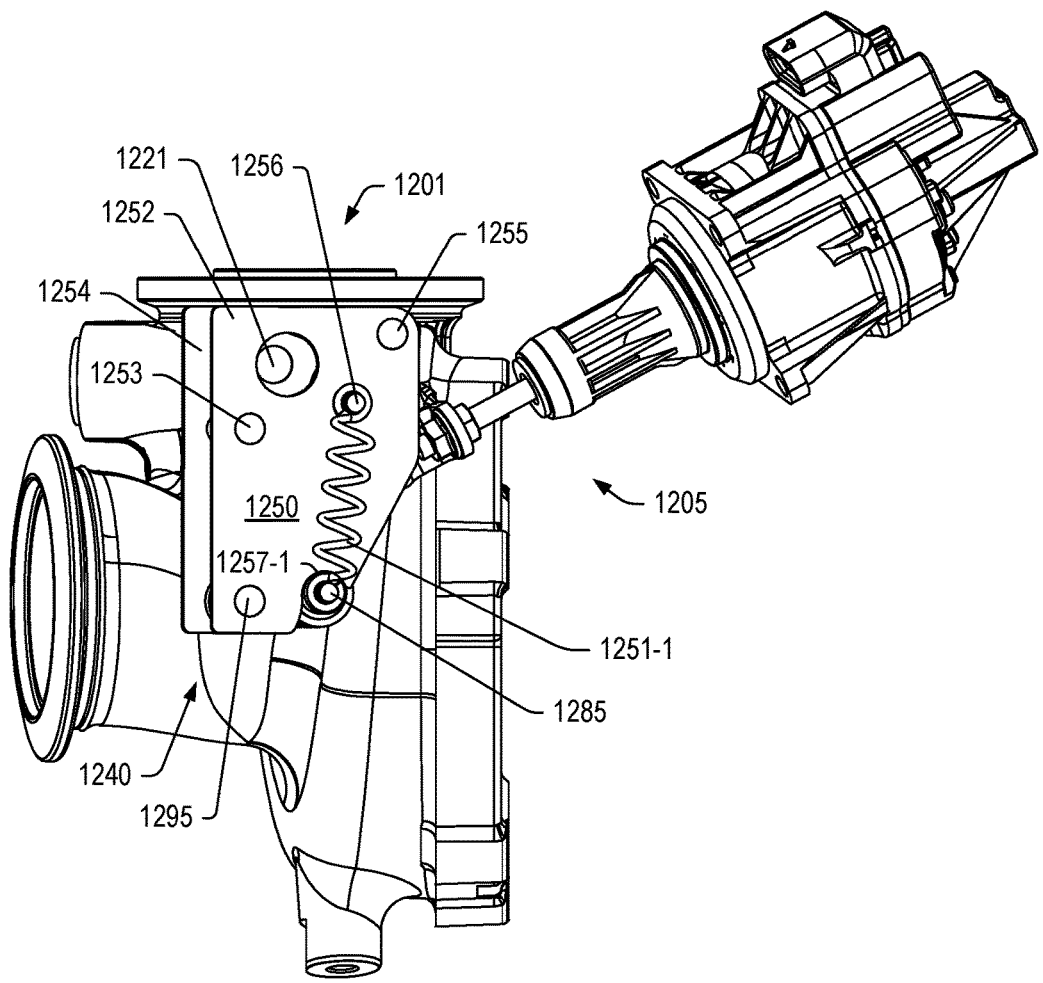
FIG. 12 is a perspective view of an example of an assembly.

FIGS. 12, 13, 14, 15, 16 and 17 show an example of an assembly 1200 or a portion thereof. As an example, the assembly 1200 can include various features of the assembly 600 or, for example, the assembly 900. FIG. 12 shows the assembly 1200 as including a housing 1201, an actuator 1205 and a linkage mechanism 1240 that includes a casing 1250. As shown in FIG. 12, the casing 1250 includes rods 1253, 1255 and 1295 that can operatively couple two plates 1252 and 1254, for example, in a substantially parallel manner where various components of the linkage mechanism 1240 can be disposed at least in part between the two plates 1252 and 1254 and be operatively coupled to the two plates 1252 and 1254, for example, via the rod 1295 (e.g., directly or indirectly).

As shown in FIG. 12, the casing 1250 includes a post 1256 for coupling an end of a spring 1251-1 where the spring 1251-1 is operatively coupled to an axle 1285 that is seated with respect to a notch 1257-1 of the plate 1252. In such an example, the spring 1251-1 can apply force to the axle 1285 that acts to maintain the axle 1285 seated with respect to the notch 1257-1. In such an example, some movement of the axle 1285 may occur, for example, during actuation of the actuator 1205, etc., which can apply force to the linkage mechanism 1240. As an example, the axle 1285 may be referred to as a movable and biased axle.

Figure 13:
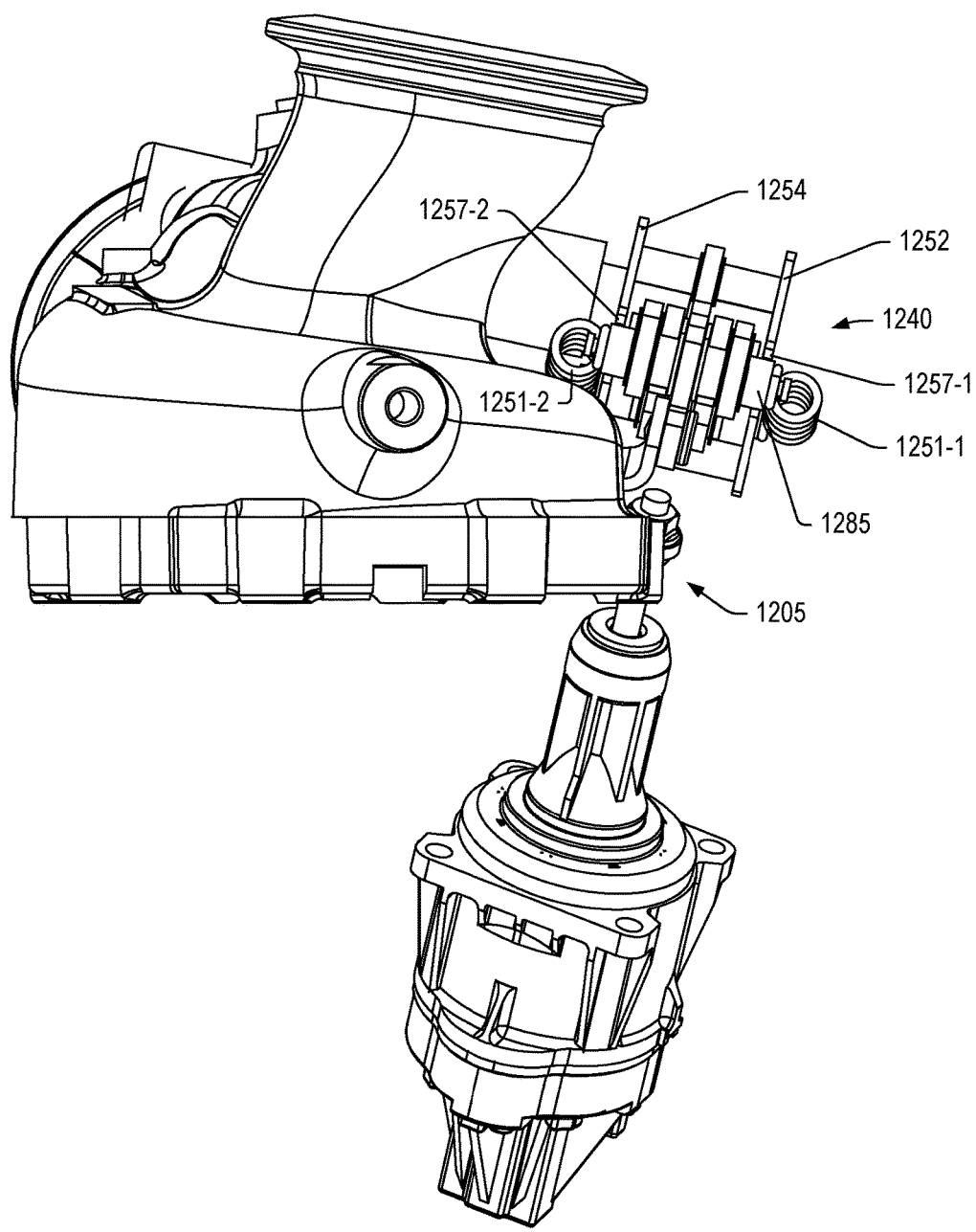
FIG. 13 is a perspective view of the assembly of FIG. 12.

FIG. 13 shows another view of the assembly 1200 where a spring 1251-2 is shown as being operatively coupled to the axle 1285 where the axle 1285 is seated with respect to the notch 1257-1 of the plate 1252 and a notch 1257-2 of the plate 1254.

Figure 14:
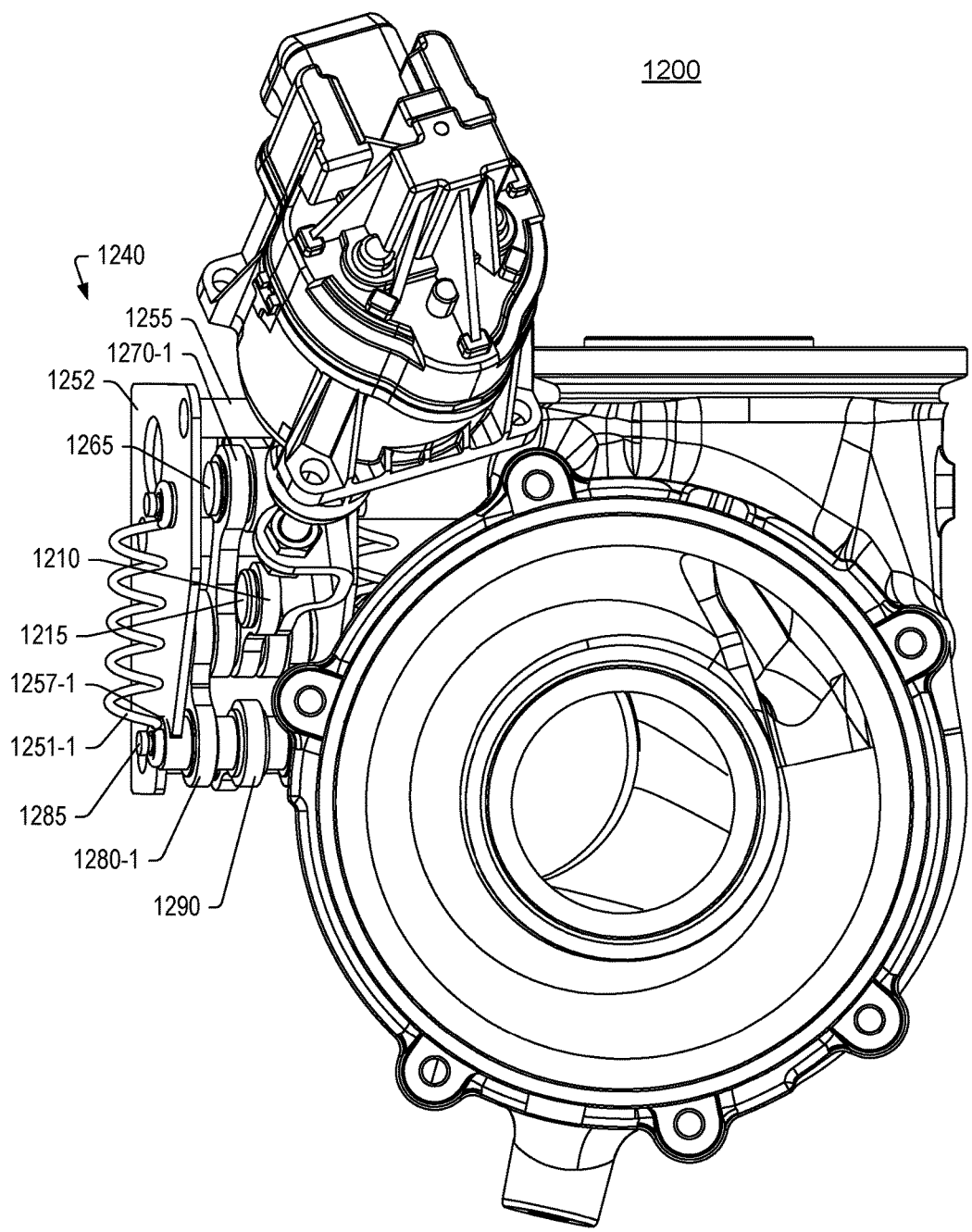
FIG. 14 is a perspective view of the assembly of FIG. 12.

FIG. 14 shows another view of the assembly 1200 where links 1210, 1270-1, 1280-1 and 1290 are shown along with axles 1215, 1265 and 1285.

Figure 15:
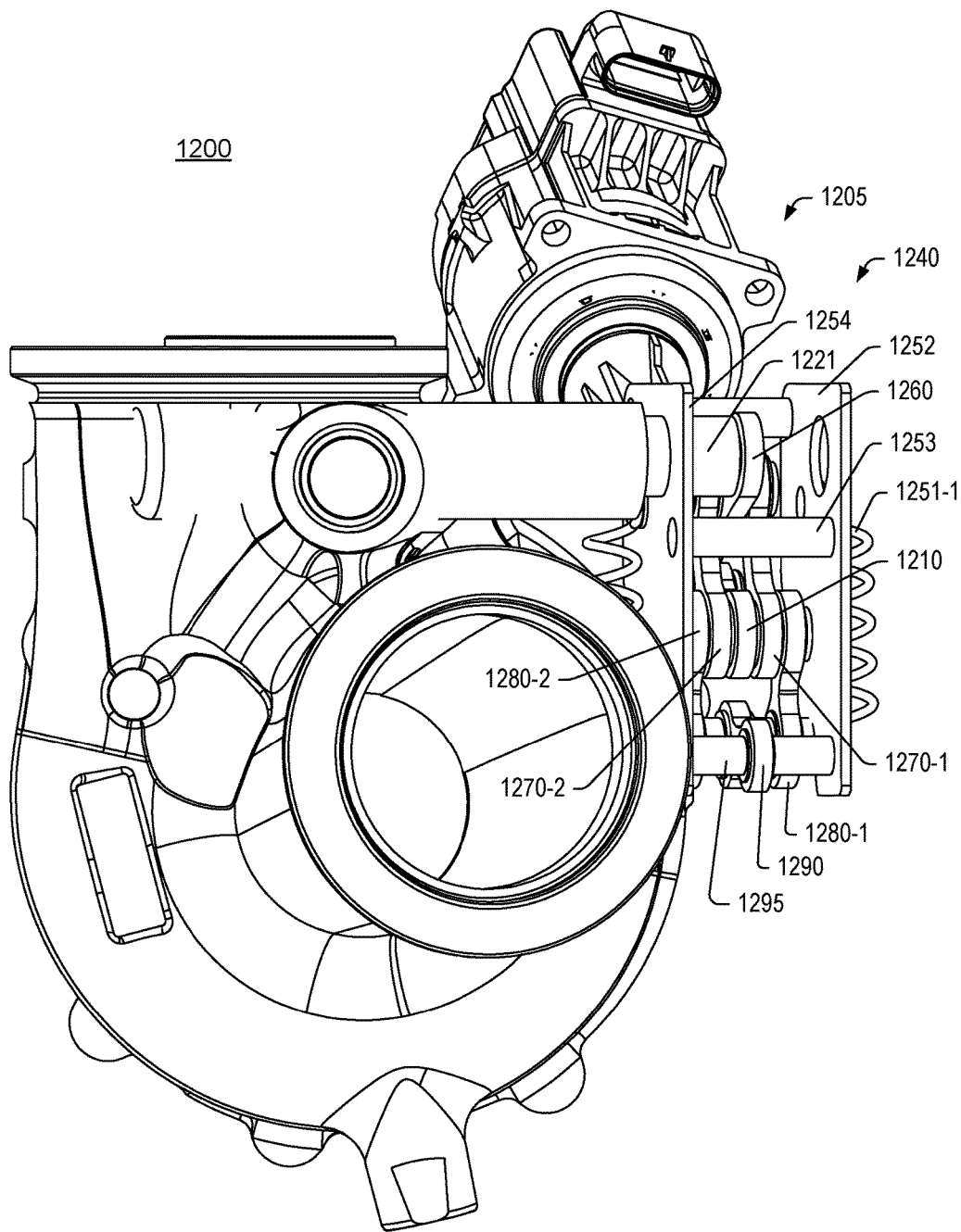
FIG. 15 is a perspective view of the assembly of FIG. 12.

FIG. 15 shows another view of the assembly 1200 where links 1210, 1260, 1270-1, 1270-2, 1280-1, 1280-2 and 1290 are shown. In the example of FIG. 15, a portion of the linkage mechanism 1240 includes five links across a common axle; specifically, links 1280-1, 1270-1, 1210, 1270-2 and 1280-2 are coupled via a common axle. In the example assembly 1200, the link 1290 alone is coupled to the axle 1295, which is shown as a fixed axle, and the link 1260 alone is coupled to the shaft 1221 of the valve while the link 1210 alone is coupled to the actuator 1205.

Figure 16:
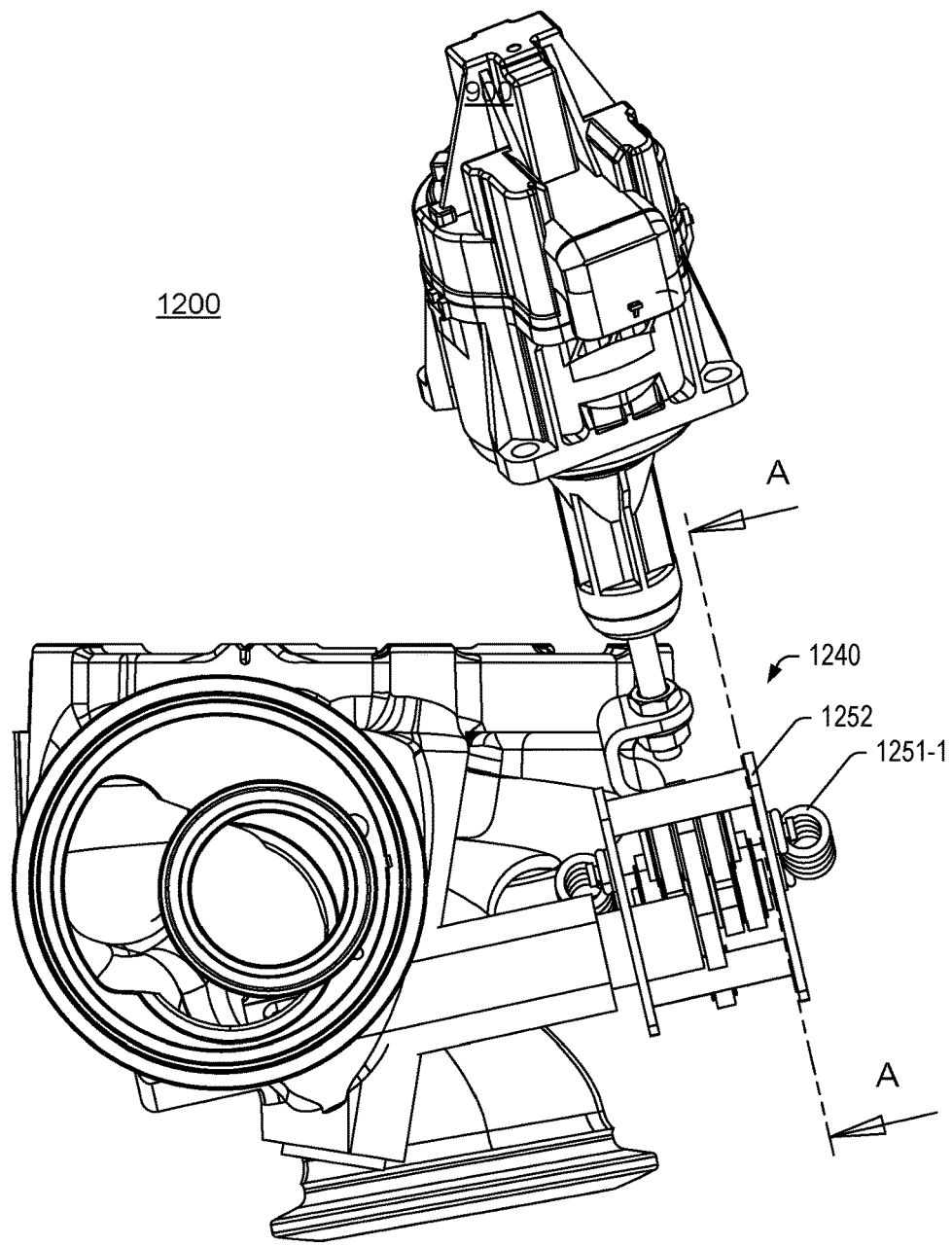
FIG. 16 is a perspective view of the assembly of FIG. 12.
Figure 17:
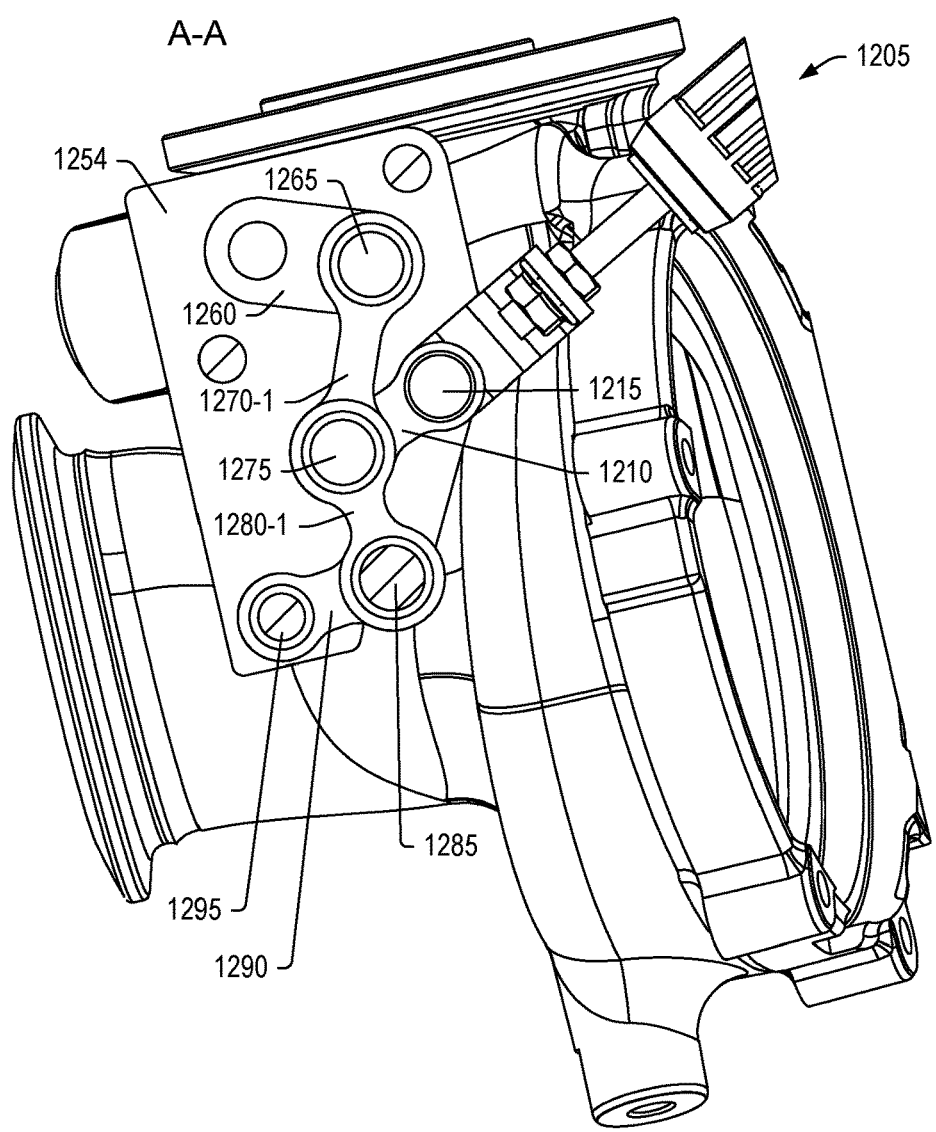
FIG. 17 is a perspective cut-away view of the assembly of FIG. 12 along a plane identified by a line A-A in FIG. 16.

FIG. 16 shows another view of the assembly 1200 where a line A-A represents a cutting plane for purposes of cut-away view of FIG. 17.

FIG. 17 shows a cut-away view of a portion of the assembly 1200 where various components are visible, for example, due to the plate 1252 not being present. As shown in FIG. 17, the linkage mechanism 1240 includes an axle 1265 and an axle 1275 where the axle 1265 is coupled to the link 1260 and where the axle 1275 is coupled to the link 1210, which is operatively coupled to the actuator 1205.

Figure 18:
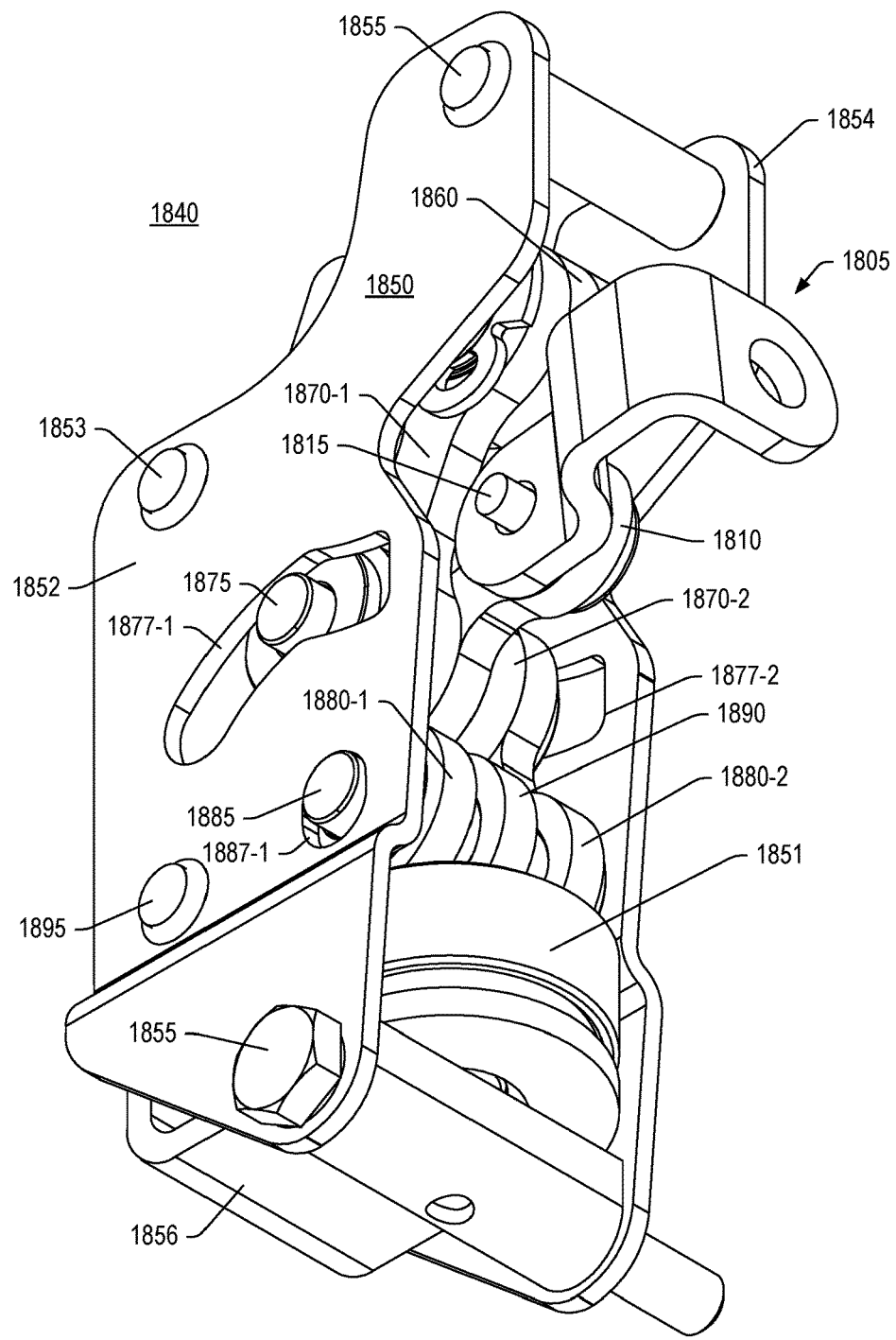
FIG. 18 is a perspective view of an example of an assembly.

FIG. 18 shows an example of a linkage mechanism 1840 that can be suitable for use with a housing and an actuator such as, for example, the housing 601, the housing 901, the housing 1201, or another housing and, for example, the actuator 605, the actuator 905, the actuator 1205, or another actuator.

In the example of FIG. 18, the linkage assembly 1840 includes links 1810, 1860, 1870-1, 1870-2, 1880-1, 1880-2 and 1890. Shown in FIG. 18 are axles 1815, 1875, 1885 and 1895. As an example, the linkage assembly 1840 may be positioned in one or more states (see, e.g., the states 801, 802 and 803 of FIG. 8).

Figure 19:
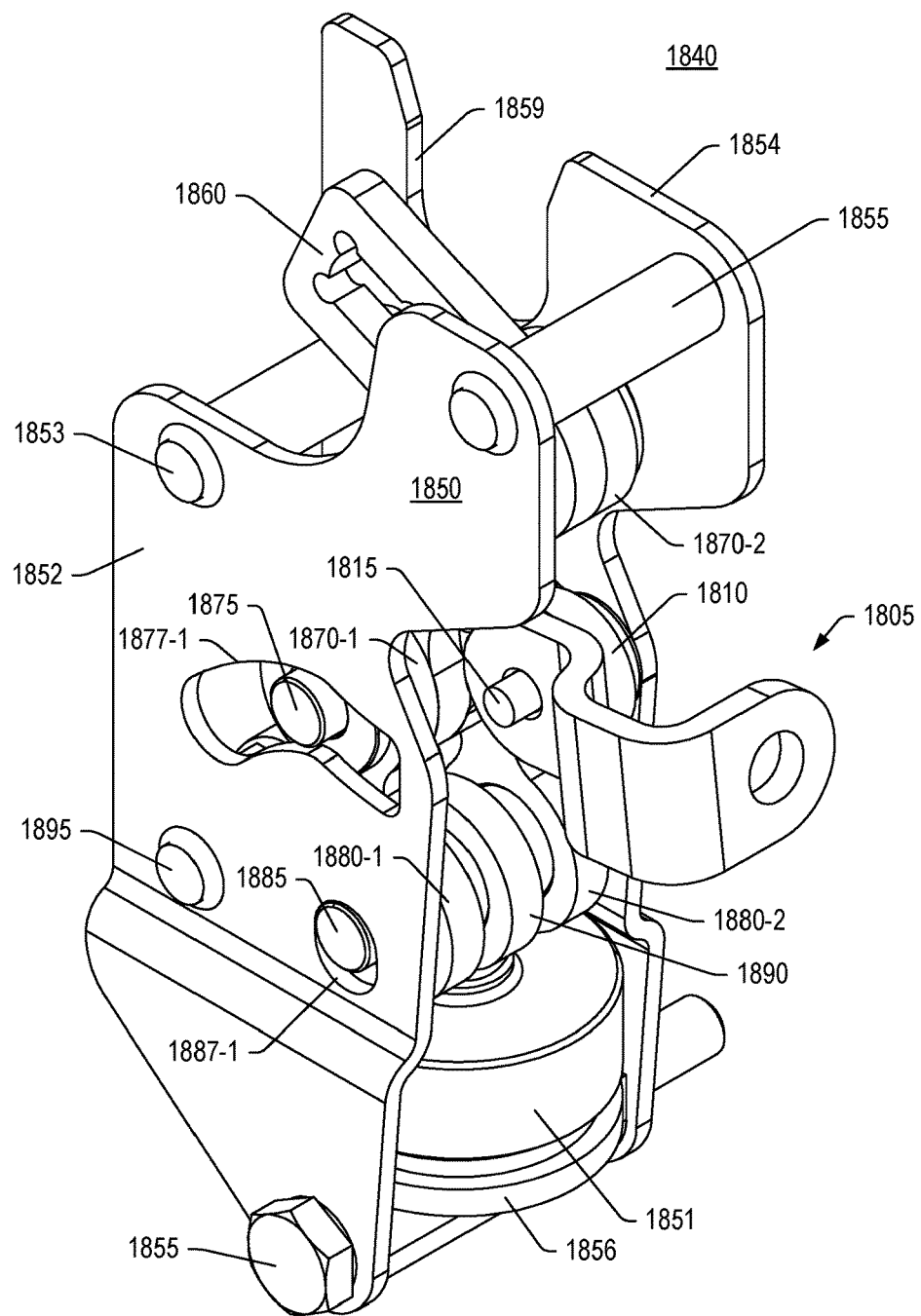
FIG. 19 is a perspective view of the assembly of FIG. 18.
Figure 20:
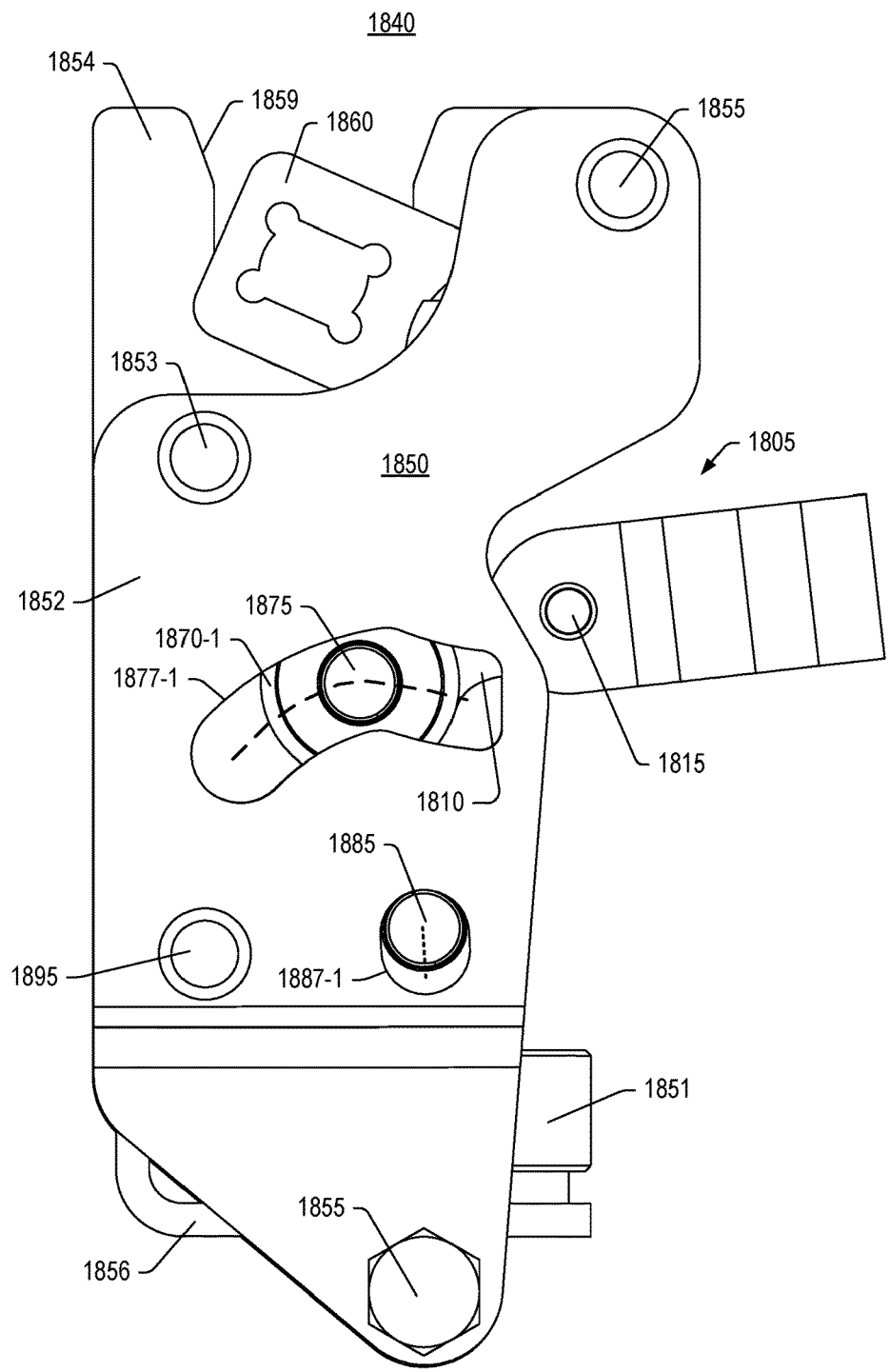
FIG. 20 is a side view of the assembly of FIG. 18.

In the example of FIG. 18, the linkage mechanism 1840 includes a casing 1850 that includes plates 1852 and 1854 that are operatively coupled via rods 1853, 1855 and 1895 such that the plates 1852 and 1854 are substantially parallel and disposed a distance from each other to accommodate various components of the linkage mechanism 1840. As shown in FIGS. 19 and 20, the plate 1854 can include a recessed portion 1859 for fitting the plate 1854 with respect to a shaft where the shaft can be operatively coupled to the link 1860 (e.g., via an opening, etc., of the link 1860).

In the example of FIG. 18, the plates 1852 and 1854 include guides, which may be shaped features and/or openings. For example, the plate 1852 includes a guide 1877-1 for guiding an axle 1875. As an example, a shape of a guide may provide for more controlled and/or limited movement of an axle. As an example, a guide may include a stop feature where, for example, an axle may sit in such a stop feature where an amount of force may move the axle out of the stop feature. For example, the guide 1877-1 includes a peak, which may correspond to a stop feature where the axle 1875 may be moved downwardly out of the peak in either direction from the peak based on force applied via an actuator coupled to an actuator linkage 1805. In the example of FIG. 18, the plate 1852 also includes a guide 1887-1 for an axle 1885 such that the axle 1885. In such an example, the axle 1885 may be limited in its movement by one or more portions of the guide 1887-1. For example, the guide 1887-1 may limit upward and/or downward movement of the axle 1885.

In the example of FIG. 18, a biasing mechanism 1851 applies a biasing force indirectly to the axle 1885 via contact with one or more of links 1880-1, 1890 and 1880-2. As an example, the biasing mechanism 1851 can include one or more biasing elements (e.g., springs, coned washers, etc.). As an example, the biasing mechanism 1851 can apply a load upon assembly of the linkage mechanism 1840. During operation the biasing mechanism 1851 may operate to travel a distance of the order of millimeters where a decrease in axial height of the biasing mechanism 1851 results in an increase of force of the biasing mechanism 1851. For example, a load at assembly of a biasing mechanism may be of the order of about 100 N (e.g., or more or less) and such a biasing mechanism may apply a load of the order of hundreds of newtons (N) during operation (e.g., consider 300 N or more or less).

As an example, a biasing mechanism can include a plurality of stacked coned washers. For example, a biasing mechanism can include a plurality of Belleville washers, which can be coned washers (e.g., annular pieces of material that are angled as may be a portion of a cone). As an example, a coned washer can provide spring characteristics and may provide a relatively high fatigue life and a relatively high load capacity with a relatively small amount of deflection (e.g., of the order of millimeters).

As an example, coned washers may be stacked to modify an effective spring constant and/or an amount of deflection. As an example, stacking in the same conical direction can add to an effective spring constant in parallel, for example, to create a stiffer joint (e.g., with the same deflection); whereas, stacking in alternating conical directions can effectively be akin to adding springs in series, resulting in a lower spring constant and greater deflection. As an example, a biasing element can include stacking in one direction or stacking in two directions, for example, to tailor spring behavior and deflection.

As an example, where n washers are stacked in parallel (facing the same direction), the deflection is equal to that of one washer, while the load is n times that of one washer. On the other hand, if n washers are stacked in series (facing in alternating directions), the deflection is equal to n times that of one washer, while the load is equal to that of one washer. As an example, consider the following equation:

$$K = \frac{k}{\sum_{i=1}^{i=g} \frac{1}{n_i}}$$

where $n_i$ is the number of washers in the ith group, g is the number of groups and k is the spring constant of one washer.

As shown in FIG. 18, the linkage mechanism 1840 includes a member 1855 and a support 1856. As shown, the member 1855 can be a bolt that may optionally be utilized to bolt the linkage mechanism 1840 to a component such as, for example, a housing. In the example of FIG. 18, the member 1855 passes through apertures in the plates 1852 and 1854. As an example, the member 1855 may be operatively coupled to a support 1856. As an example, the member 1855 may be rated to withstand force applied to the biasing mechanism 1851 without any substantial yielding such that the biasing mechanism 1851 can change in its height (e.g., due to deflection) while the member 1855 remains relatively straight.

FIG. 19 shows another view of the linkage mechanism 1840 of FIG. 18. As shown, the link 1890 can be shaped as a bar with a thickness and a perimeter where a portion of the perimeter may be rounded. In such an example, the rounded portion may be in contact with a portion of the biasing mechanism 1851. As an example, the rounded perimeter may slidably contact the portion of the biasing mechanism 1851 such that, for example, the link 1890 may pivot about the axle 1885 while maintaining contact with the biasing mechanism 1851 (e.g., as the link 1890 can move up and down at the end coupled to the axle 1885; whereas, the other end of the link 1890 can be fixed via the axle 1895). In such an example, the link 1890 is a force bearing link that is loaded by the biasing mechanism 1851 and that can apply force to the biasing mechanism 1851 to cause one or more biasing elements of the biasing mechanism 1851 to deflect. As an example, the axle 1885 may move a distance of the order of millimeters, for example, in a relatively up and down direction as may be guided by the guide 1887-1 of the plate 1852 and a corresponding guide 1887-2 of the plate 1854.

FIG. 20 shows a side view of the linkage mechanism 1840 where dashed lines indicate possible movements of the axle 1875 and the axle 1885 within the guides 1877-1 and 1887-1; noting that the plate 1854 can include corresponding guides 1877-2 and 1887-2. As shown, the plate 1854 can include the recessed portion 1859 for fitting the plate 1854 with respect to a shaft where the shaft can be operatively coupled to the link 1860 (e.g., via an opening, etc., of the link 1860).

Figure 21:
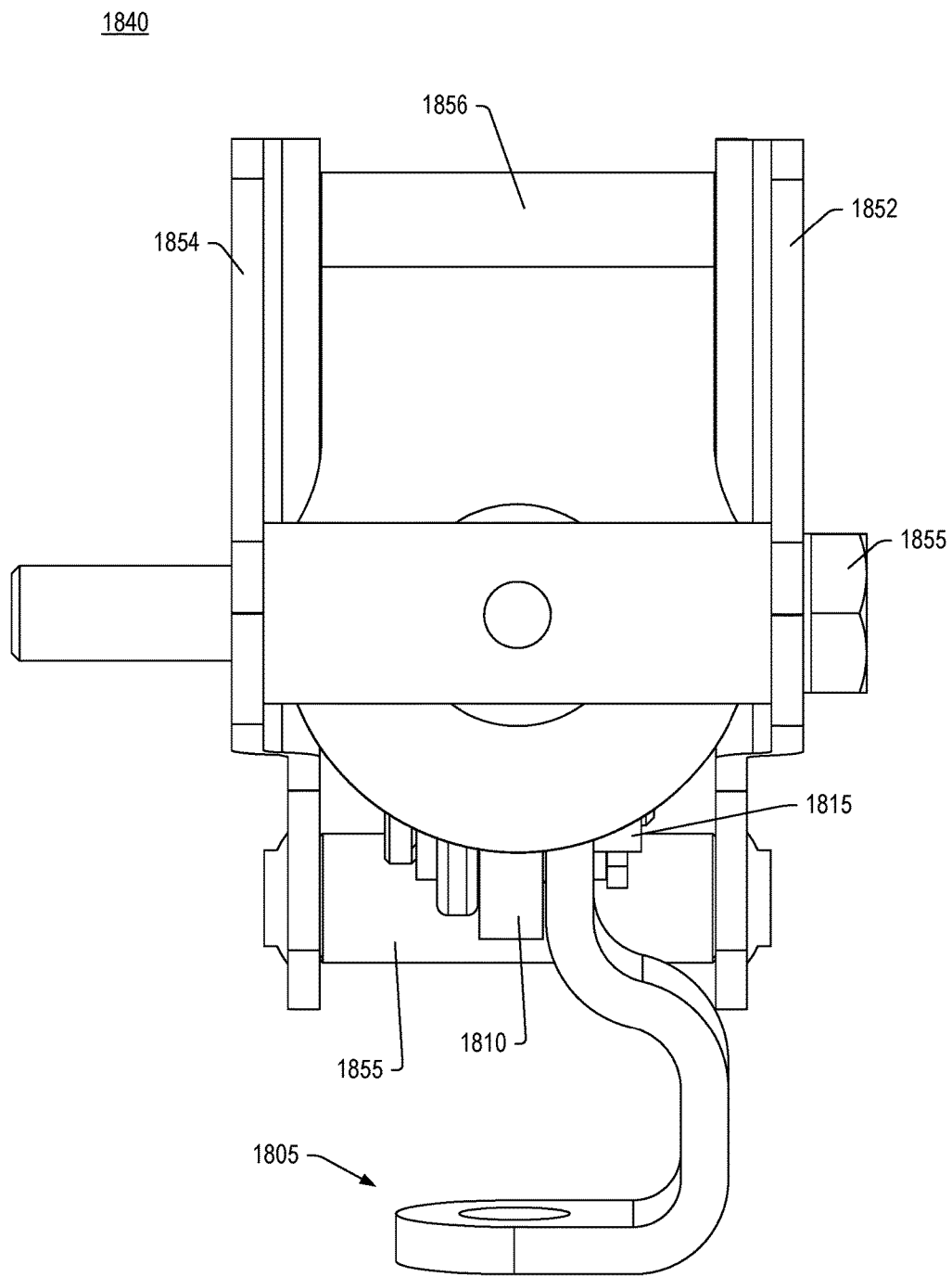
FIG. 21 is a bottom view of the assembly of FIG. 18.

FIG. 21 shows a bottom view of the linkage mechanism 1840 where the support 1856 is shown as being disposed between the plates 1852 and 1854. As shown in FIG. 21, the actuator linkage 1805 can be of a suitable shape to operatively couple an actuator rod, which may move linearly to apply force to the link 1810 as the link 1810 is coupled to the axle 1815.

Figure 22:
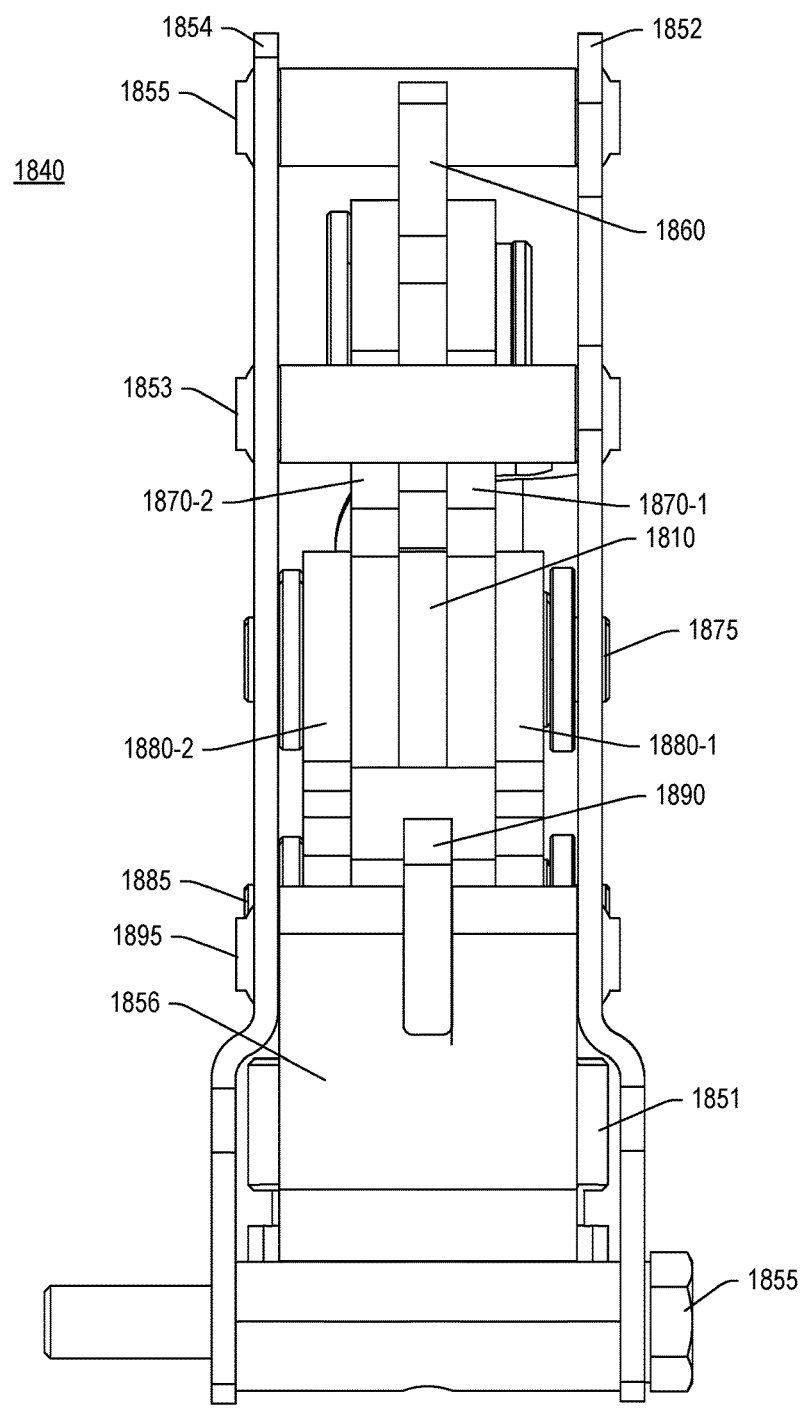
FIG. 22 is an end view of the assembly of FIG. 18.

FIG. 22 shows an end view of the linkage mechanism 1840 where, in such an example, the support 1856 may extend from a bottom bend and extend upward. For example, the support 1856 may be substantially L-shaped in a cross-section thereof.

Figure 23:
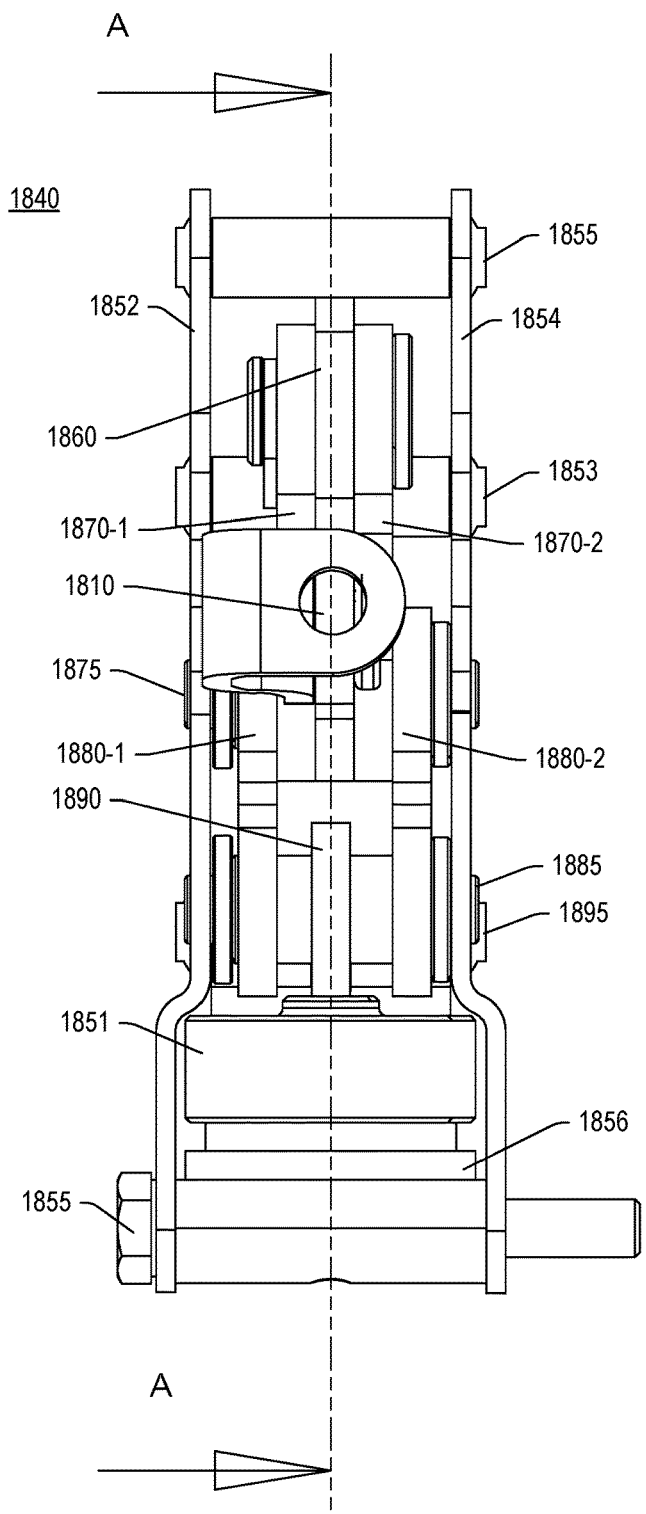
FIG. 23 is another end view of the assembly of FIG. 18.
Figure 24:
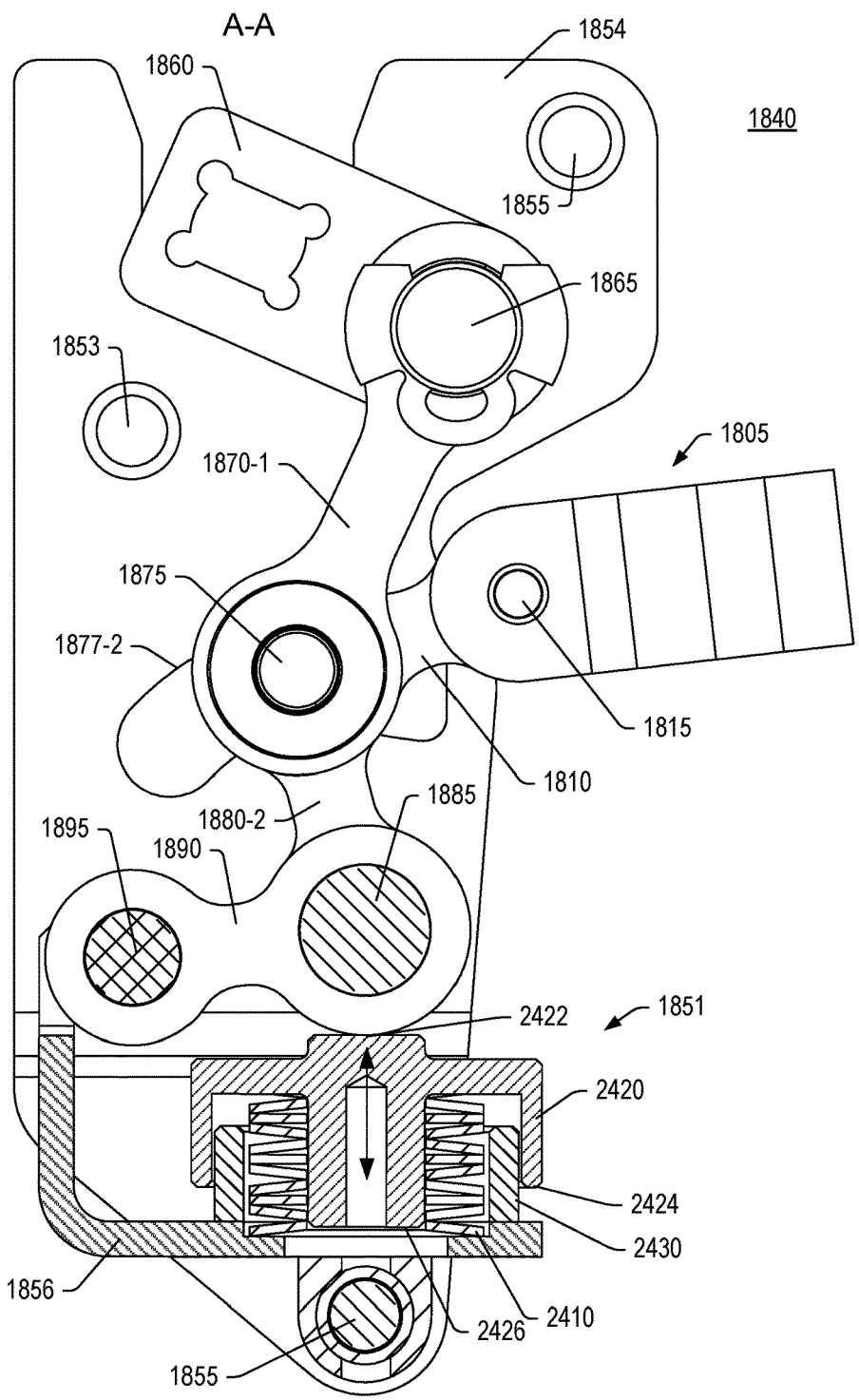
FIG. 24 is a cut-away view of the assembly of FIG. 18 along a plane identified by a line A-A in FIG. 23.
Figure 25:
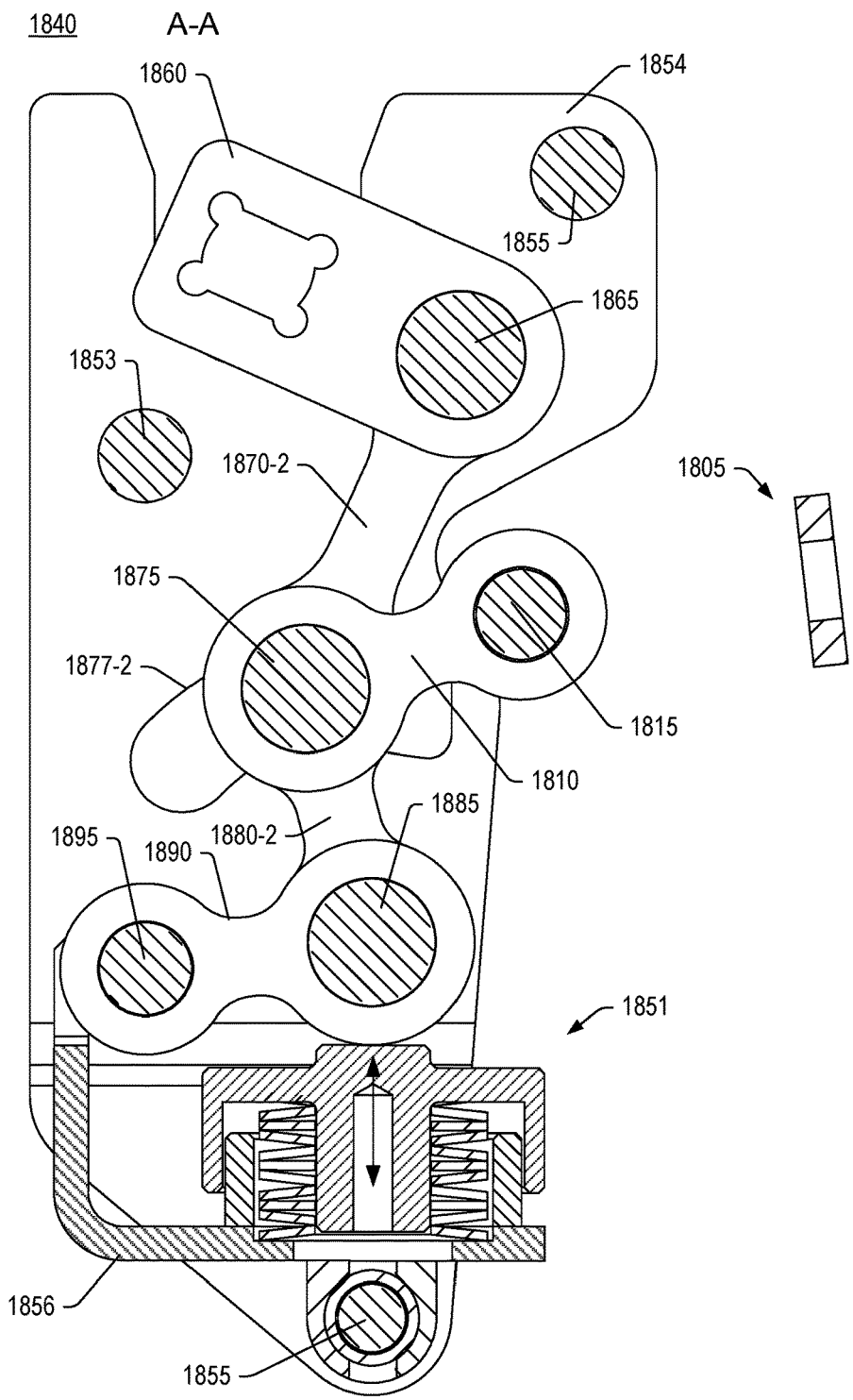
FIG. 25 is another cut-away view of the assembly of FIG. 18 along a plane identified by a line A-A in FIG. 23.

FIG. 23 shows another end view of the linkage mechanism 1840 where a line A-A indicates a cutting plane for cut-away views of FIGS. 24 and 25.

FIG. 24 shows a cut-away view of the linkage mechanism 1840 approximately along the line A-A where the plate 1852 is removed. In the example shown in FIG. 24, the biasing mechanism 1851 includes a plurality of coned washers 2410 that are stacked along a common axis and also includes a cap 2420 and a retaining wall 2430 where the cap 2420 includes a contact surface 2422, an outer rim 2424 and an inner cylinder 2426. As shown, the coned washers 2410 are stacked with openings aligned such that the inner cylinder 2426 can move up and down while, for example, maintaining alignment of the coned washers 2410, which may also be maintained in alignment via the retaining wall 2430, which includes an inner diameter that is slightly greater than an outer diameter of the coned washers 2410 and that includes an outer diameter that is slightly less than an inner diameter of the cap 2420 as at its outer rim 2424. As an example, the cap 2420 and the retaining wall 2430 may act to diminish risk of debris entering an interior space where the coned washers 2410 reside.

As an example, a rounded portion of the link 1890 can contact the contact surface 2422 and the coned washers 2410 may apply a load to the rounded portion of the link 1890 and hence the axle 1885. As an example, the coned washers 2410 may upwardly bias the cap 2420 where a bottommost coned washer of the stack may be supported in a recessed portion of the support 1856. As an example, deflection may occur for the cap 2420 (e.g., movement up and down as a unit) where the support 1856 remains stationary, for example, as may be supported in part via the member 1855. As shown, an uppermost coned washer of the stack can be in contact with a surface of the cap 2420.

As an example, a stack can include coned washers and optionally one or more flat washers. As an example, a flat washer may be disposed between two coned washers. As an example, a flat washer may facilitate contact as an intermediate component between two coned washers.

FIG. 25 shows another cut-away view of the linkage mechanism 1840 where various features of an example of the biasing mechanism 1851 are shown.

Figure 26:
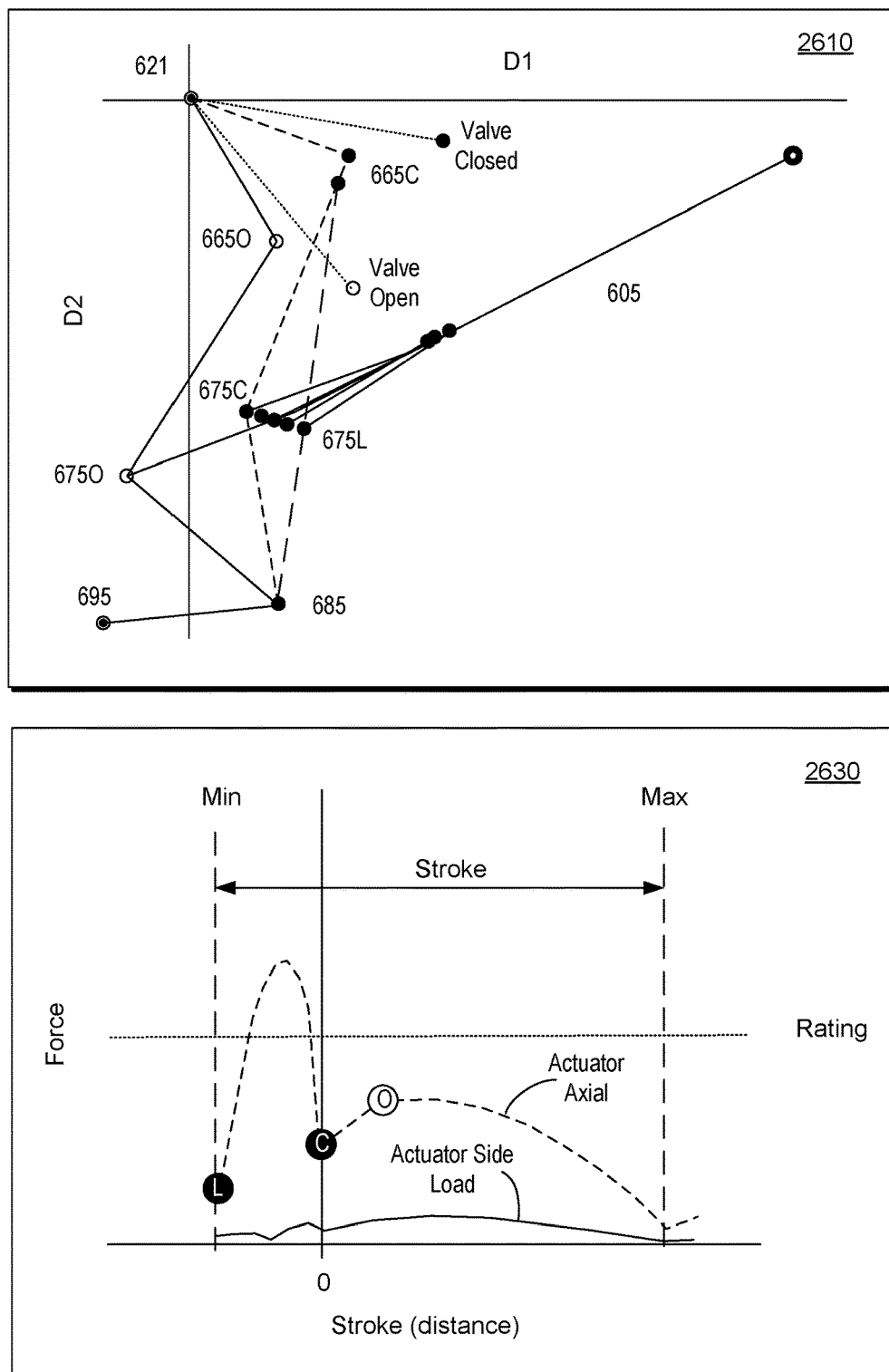
FIG. 26 is a series of example plots.

FIG. 26 shows example plots 2610 and 2630. The plot 2610 may be considered to represent a linkage mechanism akin to a pantograph that includes, for example, one or more spring elements and/or one or more viscous elements. As an example, a spring element can restrain a movable secondary linkage pivot and, for example, reduce actuator power consumption when the linkage mechanism is, for example, in a locked position. As an example, a linkage mechanism may be provided as a cartridge assembly (e.g., optionally with one or more plates). As an example, a spring element can help to compensate for linkage wear and/or thermal expansion. As an example, a spring element may help to apply to a valve a sealing force.

As an example, a plot such as the plot 2610 may be utilized as a model of a linkage mechanism where various axles can be represented in a substantially two-dimensional manner, for example, according to a dimension D1 and a dimension D2 (e.g., x and y dimensions). In such an example, the linkage mechanism can be defined at least in part by a third dimension D3 (e.g., z dimension). As an example, a linkage mechanism may be defined with respect to a three-dimensional coordinate system such as a Cartesian coordinate system or, for example, a cylindrical coordinate system. As an example, in a Cartesian coordinate system (e.g., x, y, z) various axles of a linkage mechanism can extend in a z-direction where a portion of the axles are fixed with respect to x,y positions and where a portion of the axles are movable with respect to x,y positions. In such an example, the linkage mechanism may be represented via a plot such as the plot 2610.

As an example, a plot may define positions and limits of motion for one or more axles of a linkage mechanism. As an example, where the linkage mechanism includes a rotatable axle that is operatively coupled to a valve, a range of rotation of the rotatable axle can correspond to positions of the valve, for example, with respect to a valve seat to define open and/or closed states of the valve. As an example, a plot may be a force plot that can illustrate one or more forces that correspond to one or more positions and/or transitions between a positional state and another positional state (e.g., consider open, closed and closed and locked states).

In FIG. 26, the plot 2630 includes an x-axis that corresponds to actuator stroke (e.g., actuator rod position) with positive and negative deviations about a zero point position that corresponds to the closed state 802 of the bypass valve. In the plot 2630, the y-axis corresponds to force. As shown, for transitions to and out of the locked state, force can be relatively high; however, in the locked state an actuator force may be reduced as force applied by one or more biasing elements (e.g., springs) may maintain a bypass valve in a closed state. As shown, transitions from the closed state to the open state may be achieved via positive deviation from the zero point where force applied by an actuator may gradually increase and then decrease (e.g., in a manner that can depend on pressure due to exhaust gas being applied to a bypass valve).

Figure 27:
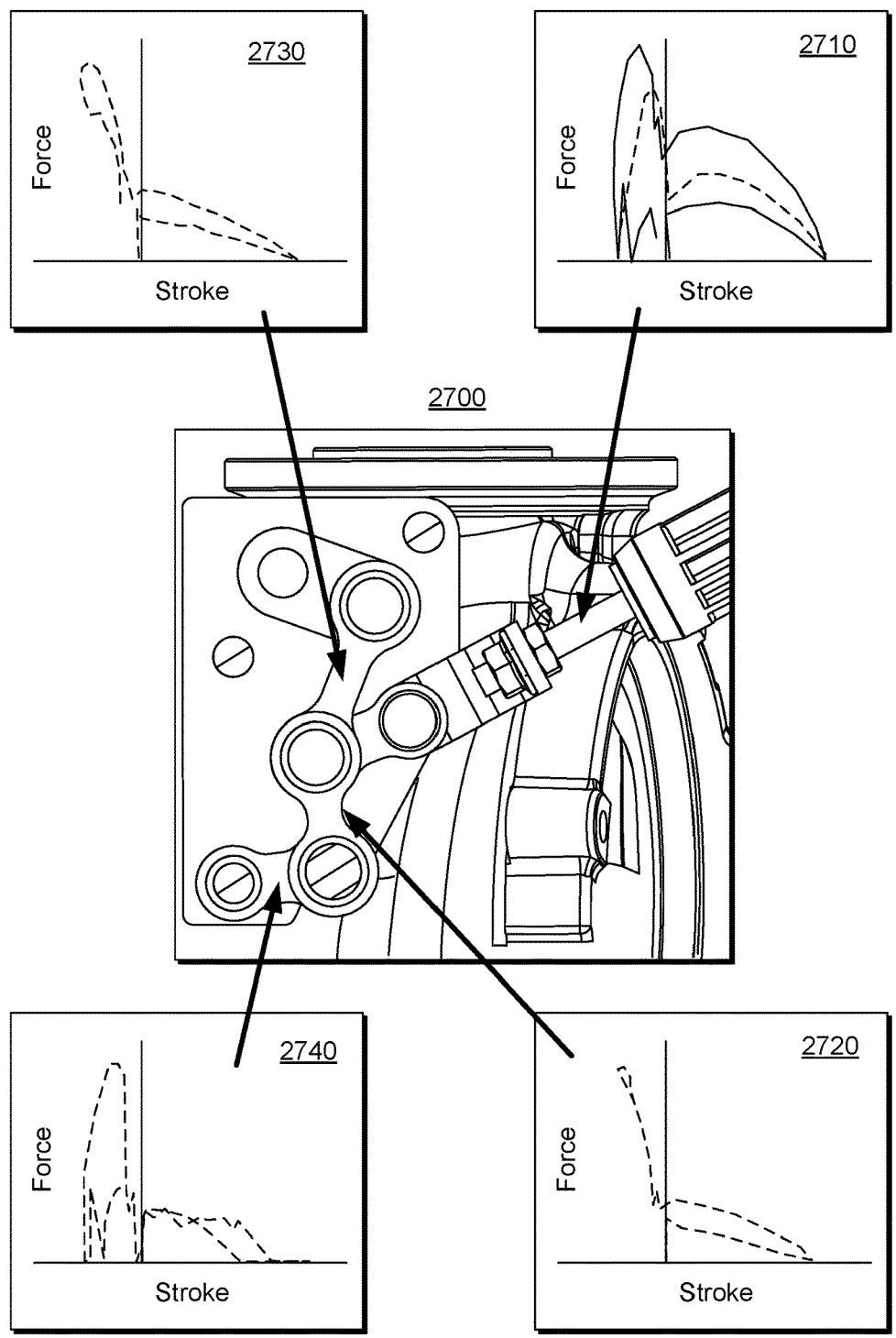
FIG. 27 is a series of example plots associated with an example of an assembly.

FIG. 27 shows an example of a portion of an assembly 2700 with example plots 2710, 2720, 2730 and 2740. As shown, the plots 2710 and 2720 show force versus actuator stroke with respect to a zero point that corresponds to a closed state of a bypass valve where the plot 2720 corresponds to the link 970 of FIG. 9.

In FIG. 27, the plots 2730 and 2740 show force versus actuator stroke with respect to a zero point that corresponds to a closed state of a bypass valve where the plot 2730 corresponds to the link 980 and where the plot 2740 corresponds to the link 990 of FIG. 9.

As an example, a linkage mechanism may apply a pantograph leverage actuator force via kinematic arrangement of components. In such an example, a force ratio may be quite high. In such an example, one or more spring elements can be included (e.g., to reduce load). As an example, one or more springs may be located at one or more locations. As an example, a spring or springs may apply a preload. Referring to the example of FIG. 9, the spring 951 (e.g., and a corresponding spring on the other side) may act to bias the axle 965 upward where, for example, the actuator 905 may act to apply force. As an example, a spring may be a biasing mechanism such as, for example, the biasing mechanism 1851 of FIG. 18.

As an example, an external kinematic arrangement of components may be packaged in a cartridge. Such an approach may help to facilitate assembly of a turbocharger system, decouple the cartridge from turbocharger housing thermal effects (e.g., thermal expansion), allow for preloaded components via one or more springs, allow for wear recovery (e.g., replacement) and allow for a self-locking ability. Such a cartridge may optionally be calibrated.

As an example, in a locked state, a linkage assembly may help to reduce loading on an actuator. As an example, an electric actuator may be coupled to control circuitry where, in a locked state, power requirements may optionally be reduced.

As an example, a 2-Stage TBV (Turbine Bypass Valve) mechanism can act to have a valve held closed against exhaust gas manifold pressure, for example, at low power/low engine RPM operating points. Relatively high pressure differentials across such a valve can require a relatively large, continuous actuator force to be applied to the mechanism. Various electric actuators may not necessarily be suited to high, continuous load operating conditions (e.g., due to the resistive heating of the actuator motor coils which can limit available peak, continuous force. Large vacuum pneumatic actuators may be used for these applications but they require a vacuum source (e.g., an engine mounted vacuum pump) and are more suited to on-off type operation rather than fine-control actuation which is desirable during the 2-stage system transition from the high pressure turbo to the low pressure turbo.

As an example, a linkage mechanism may employ a pantograph type of arrangement of components. In such an example, a compliant (e.g., spring) member in the mechanism linkage can enable the linkage to pass over a mechanism "dead-point" to a self-locking state (e.g., akin to a vise-grip wrench mechanism). For example, in a locking state, a mechanism can be held with a bypass valve in a closed state without requiring an external actuator load and therefore may be actuated by an electric actuator using, for example, combined benefits of the kinematic mechanism force multiplication near the mechanism dead-point and the self-locking effects to reduce the required continuous actuator force.

As an example, locking pliers, Mole™ grips or Vise-Grips™ are pliers that can be locked into position, using an over-center action. One side of the handle can include a bolt that is used to adjust the spacing of the jaws, the other side of the handle (e.g., in larger models) often includes a lever to push the two sides of the handles apart to unlock the pliers.

As an example, an assembly for an exhaust bypass valve of a two-stage turbocharger can include a first turbocharger stage; a second turbocharger stage; an exhaust bypass valve that includes an open state and a closed state; and a linkage mechanism that links the exhaust bypass valve to an actuator where the linkage mechanism includes a locked state for the closed state of the exhaust bypass valve. In such an example, the linkage mechanism can include at least one spring. As an example, a linkage mechanism can include at least one plate. As an example, a linkage mechanism can include multiple links and axles that interconnect adjacent links. As an example, an assembly can include an actuator, which may be an electrical actuator supplied via an electrical power supply line (e.g., one or more cables, etc.).

As an example, a linkage mechanism can include a zero point that corresponds to a closed state of an exhaust bypass valve (e.g., exhaust gas bypass valve) and a negative displacement that corresponds to the locked state. In such an example, a positive displacement can corresponds to an open state of the exhaust bypass valve.

As an example, an exhaust bypass valve, in an open state, can allow at least a portion of exhaust gas of an internal combustion engine to bypass one of multiple turbocharger stages. As an example, a first turbocharger stage can be a low exhaust gas flow stage and a second turbocharger stage can be a high exhaust gas flow stage. As an example, in the open state of an exhaust bypass valve, a path can be opened for at least a portion of exhaust gas of an internal combustion engine to bypass a first turbocharger stage.

As an example, a linkage mechanism can include a first link that is fixed to a shaft of an exhaust bypass valve, a second link, a third link and a fourth link where a first axle links the first and second links, where a second axle links the second and third links and where a third axle links the third and fourth links. In such an example, a fifth link that is linked to the second axle can provide for coupling the linkage mechanism to an actuator. As an example, at least one spring can be operatively coupled to the aforementioned third axle and, for example, the at least one spring can be operatively coupled to a casing of the linkage mechanism. As an example, the casing of the linkage mechanism can include at least one post to operatively couple at least one spring thereto (e.g., or an opening to hook a spring, etc.).

As an example, a linkage mechanism can include a casing that includes substantially parallel plates. In such an example, at least one of the plates can include a notch that seats an axle of the linkage mechanism. In such an example, at least one spring can bias the axle with respect to the notch where, for example, the at least one spring is operatively coupled to the axle and to the casing of the linkage mechanism.

As an example, an assembly can include a housing and a linkage mechanism can be attached to the housing (e.g., via a bolt or bolts, via a bracket, etc.).

As an example, an assembly for an exhaust bypass valve of a two-stage turbocharger can include a first turbocharger stage; a second turbocharger stage; an exhaust bypass valve that includes an open state and a closed state; and a linkage mechanism that links the exhaust bypass valve to an actuator where the linkage mechanism includes a locked state for the closed state of the exhaust bypass valve where the linkage mechanism includes at least one spring where the at least one spring applies a force to a movable axle of the linkage mechanism. For example, a spring may apply a force directly to an axle or indirectly to an axle, for example, via contact with a portion of a link. As an example, a spring can be a coned washer or, for example, a spring can include a plurality of coned washers. As an example a stack of components can include coned washers arranged to form a spring that can apply a force to a member of a linkage mechanism, which can be a movable member such as, for example, a movable axle. In such an example, the force may be applied directly or indirectly to the member.

As an example, a linkage mechanism can include at least one spring. In such an example, the at least one spring can apply a force to a movable axle of the linkage mechanism where the movable axle may be limited in its movement by, for example, a feature of the linkage mechanism (e.g., a notch, a guide, etc.). As an example, such a force may be, in a locked state, a locking force. For example, the force applied by a biasing mechanism (e.g., one or more biasing elements) can maintain a linkage mechanism in a locked state. In such an example, an actuator may be actuated to apply a force that can transition the linkage mechanism from the locked state to an unlocked state, which may be, for example, an unlocked and closed state or an unlocked and open state.

As an example, a biasing mechanism can include one or more types of biasing elements. For example, such a mechanism may include a spring, which may be, for example, coil spring, a coned washer, etc. As an example, at least one spring of a biasing mechanism may be a coned washer (e.g., consider a stack of coned washers).

As an example, a linkage mechanism can include at least four axles and at least four axle-to-axle links where the at least four axles include at least one fixed axle and at least three movable axles. Where an axle is fixed, fixed can refer to its position in a plane rather than, for example, its ability to rotate. For example, an axle that is a shaft coupled to a valve plug may be fixed (e.g., substantially fixed by a bushing in a bore, etc.) yet be rotatable to move the valve plug.

As an example, a linkage mechanism can include two end axles and three intermediate axles where the end axles are at fixed positions, where one of the end axles is rotatable to position an exhaust bypass valve in an open state and in a closed state, where one of the intermediate axles is biased by a biasing mechanism, and where another one of the intermediate axles is coupled to the actuator.

As an example, a linkage mechanism can include a zero point that corresponds to the closed state of the exhaust bypass valve, a first displacement to one side of the zero point that corresponds to the locked state and a second displacement to another side of the zero point that corresponds to the open state of the exhaust bypass valve.

As an example, a linkage mechanism can include a casing where at least one spring is operatively coupled to the casing. For example, a casing can include a plate where the plate is part of a support for a spring or springs. As an example, one end or side of a spring or springs may be fixed while another end may be movable, for example, to move along with a component of a linkage mechanism.

As an example, a casing can include one or more guides that may guide movement of an axle or axles of a linkage mechanism. As an example, a guide may operate to guide an axle that is loaded at least in part by a spring or springs. In such an example, the guide may optionally include an end surface or end surfaces that may act as stop surfaces, for example, to limit the movement of an axle. As an example, a plate may include one or more guides and/or one or more stop surfaces. As an example, a stop surface may act to stop an axle, a link, etc., which may determine a limit as to movement of a rotatable axle of the linkage mechanism that is operatively coupled to a valve.

As an example, a linkage mechanism can include a plate that includes a guide that guides movement of an axle of the linkage mechanism. In such an example, at least one spring can apply a force to the axle. As an example, the force may be a load, for example, a pre-load as determined upon assembly of the linkage mechanism.

As an example, an assembly can include a housing and a linkage mechanism that is attached to the housing. In such an example, the housing may include one or more passages for flow of exhaust from an internal combustion engine (e.g., via one or more conduits, etc.).

As an example, a linkage mechanism may be mounted to a housing of an exhaust turbine system. As an example, a mount may position the linkage mechanism such that physical contact is minimized to thereby reduce a heat transfer from the housing to the linkage mechanism. As an example, a single bolt may be utilized to mount a linkage mechanism to a housing of an exhaust turbine system.

As an example, a method can include transitioning a linkage mechanism via an actuator to a closed and locked state with respect to a valve and, while in the locked state, reducing power supplied to the actuator. For example, the actuator can be an electrically powered actuator where a reduction in power supplied thereto can allow the actuator to cool or, for example, not generate heat energy due to supply of electrical power. As an example, a duty cycle for a linkage mechanism and actuator system of a vehicle may be predominantly in a closed and locked state such that power supplied to the actuator can be for portions of the duty cycle where, for example, opening of a valve is desired (e.g., an exhaust bypass valve of a turbocharger system).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. An assembly for an exhaust bypass valve of a two-stage turbocharger, the assembly comprising:
   a first turbocharger stage;
   a second turbocharger stage;
   an exhaust bypass valve that comprises an open state and a closed state;
   an actuator; and
   a linkage mechanism that links the exhaust bypass valve to the actuator;
   wherein the linkage mechanism comprises a locked, closed state wherein the linkage mechanism is in a locked position for the closed state of the exhaust bypass valve;
   wherein the linkage mechanism comprises a movable axle and a casing;
     wherein the casing comprises two parallel plates and at least one fixed support, and
     wherein each of the two parallel plates comprises a respective seating feature that comprises a notch that seats the movable axle or a guide that seats the movable axle; and
   wherein the linkage mechanism comprises at least one spring being operatively coupled to at least one of the at least one fixed support to apply a force to the movable axle wherein the force biases the movable axle with respect to the respective seating features of the two parallel plates.

2. The assembly of claim 1 wherein, in the locked, closed state, the force is a locking force.

3. The assembly of claim 1 wherein the at least one spring comprises at least one coned washer.

4. The assembly of claim 1 wherein the linkage mechanism comprises at least four axles and at least four axle-to-axle links wherein the at least four axles comprise at least one fixed axle and at least three movable axles.

5. The assembly of claim 1 wherein the linkage mechanism comprises two end axles and three intermediate axles wherein the end axles are at fixed positions, wherein one of the end axles is rotatable to position the exhaust bypass valve in the open state and in the closed state, wherein one of the intermediate axles is the movable axle, and wherein another one of the intermediate axles is coupled to the actuator.

6. The assembly of claim 1 wherein the linkage mechanism comprises a zero point that corresponds to the closed state of the exhaust bypass valve, a first displacement to one side of the zero point that corresponds to the locked position of the locked, closed state and a second displacement to another side of the zero point that corresponds to the open state of the exhaust bypass valve.

7. The assembly of claim 1 wherein the exhaust bypass valve, in the open state, allows at least a portion of exhaust gas of an internal combustion engine to bypass one of the turbocharger stages.

8. The assembly of claim 1 wherein the first turbocharger stage comprises a low-pressure turbocharger and wherein the second turbocharger stage comprises a high-pressure turbocharger.

9. The assembly of claim 1 wherein in the open state of the exhaust bypass valve, a path exists for at least a portion of exhaust gas of an internal combustion engine to bypass the first turbocharger stage.

10. The assembly of claim 1 wherein the linkage mechanism comprises a first link that is fixed to a shaft of the exhaust bypass valve, a second link, a third link and a fourth link wherein a first axle links the first and second links, wherein a second axle links the second and third links and wherein a third axle links the third and fourth links.

11. The assembly of claim 10 further comprising a fifth link that is linked to the second axle for coupling the linkage mechanism to an actuator.

12. The assembly of claim 10 wherein the third axle is the movable axle.

13. An assembly for an exhaust bypass valve of a two-stage turbocharger, the assembly comprising:
   a first turbocharger stage;
   a second turbocharger stage;
   an exhaust bypass valve that comprises an open state and a closed state;
   an actuator; and
   a linkage mechanism that links the exhaust bypass valve to the actuator wherein the linkage mechanism that is positionable in a locked state for the closed state of the exhaust bypass valve, wherein the linkage mechanism comprises two end axles and three intermediate axles wherein the end axles are at fixed positions, wherein one of the end axles is rotatable to position the exhaust bypass valve in the open state and in the closed state, wherein one of the intermediate axles is biased by a biasing mechanism, and wherein another one of the intermediate axles is coupled to the actuator.

* * * * *